US012597560B2

(12) United States Patent
Kim et al.

(10) Patent No.: US 12,597,560 B2
(45) Date of Patent: Apr. 7, 2026

(54) CAPACITOR COMPONENT

(71) Applicant: SAMSUNG ELECTRO-MECHANICS CO., LTD., Suwon-si (KR)

(72) Inventors: Han Kim, Suwon-si (KR); Sang Jong Lee, Suwon-si (KR); Min Cheol Park, Suwon-si (KR); Su Bong Jang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 389 days.

(21) Appl. No.: 18/221,549

(22) Filed: Jul. 13, 2023

(65) Prior Publication Data

US 2024/0062960 A1     Feb. 22, 2024

(30) Foreign Application Priority Data

Aug. 17, 2022     (KR) ........................ 10-2022-0102849

(51) Int. Cl.
H01G 4/012          (2006.01)
H01G 4/232          (2006.01)
(52) U.S. Cl.
CPC ............. H01G 4/012 (2013.01); H01G 4/232 (2013.01)

(58) Field of Classification Search
CPC ...... H01G 4/012; H01G 4/232; H01G 4/1209; H01G 4/005; H01G 4/385; H01G 4/38; H01G 4/30; H01G 4/002; H01G 4/12; H01G 4/2325
See application file for complete search history.

(56) References Cited

U.S. PATENT DOCUMENTS

| | | | |
|---|---|---|---|
| 2008/0278885 A1 | 11/2008 | Nabeshima | |
| 2010/0177461 A1 | 7/2010 | Tuncer | |
| 2014/0160628 A1 | 6/2014 | Doyle et al. | |
| 2019/0198252 A1* | 6/2019 | Son .......................... | H01G 4/30 |

FOREIGN PATENT DOCUMENTS

| | | | | |
|---|---|---|---|---|
| CN | 113517137 A | * | 10/2021 | ............... H01G 4/30 |
| JP | H06-5459 A | | 1/1994 | |
| JP | H10340826 A | * | 12/1998 | |
| JP | 2016-501440 A | | 1/2016 | |
| KR | 10-1738060 B1 | | 5/2017 | |
| WO | 2014/092785 A1 | | 6/2014 | |

* cited by examiner

*Primary Examiner* — Timothy J. Dole
*Assistant Examiner* — Daniel M Dubuisson
(74) *Attorney, Agent, or Firm* — Morgan Lewis & Bockius LLP

(57) ABSTRACT

According to an embodiment of the present disclosure, since the outer electrode of the first unit device and the outer electrode of the second unit device may have different polarities, capacitance may be generated in each of the first unit device and the second unit device and capacitance may be generated between the first and second unit devices, thereby maximizing capacitance per unit volume.

39 Claims, 26 Drawing Sheets

1000

FIRST
DIRECTION

SECOND
DIRECTION

THIRD
DIRECTION

FIRST
DIRECTION

SECOND
DIRECTION

I-I'

100-1

THIRD
DIRECTION

SECOND
DIRECTION

II – II'

FIRST
DIRECTION

SECOND
DIRECTION

I-I'

THIRD
DIRECTION

SECOND
DIRECTION

CAPACITOR COMPONENT

CROSS-REFERENCE TO RELATED APPLICATION(S)

This application claims benefit of priority to Korean Patent Application No. 10-2022-0102849, filed on Aug. 17, 2022 in the Korean Intellectual Property Office, the disclosure of which is incorporated herein by reference in its entirety.

TECHNICAL FIELD

The present disclosure relates to a capacitor component.

With the development of technology, demand for chip-type electronic components having high capacitance in a small volume is increasing. Accordingly, as IT products are miniaturized and highly functionalized, capacitors used in IT products are also required to be miniaturized and to have high-capacitance.

In line with this trend, a multilayer ceramic capacitor (MLCC) may use a dielectric developed to have a high dielectric constant while increasing the thinning of the dielectric and internal electrodes.

However, stacked capacitors are currently close to the limit of capacitance per unit volume due to the decrease in BDV (breakdown voltage) due to thinning and the structural capacitance limit of the area stacking method.

In order to solve this problem, various types of capacitors have been developed, and for example, a capacitor using a wire-type unit device has been developed. A wire-type unit device has a shape in which a dielectric and a metal are alternately coated on a metal wire, and research is being conducted to improve a capacitance per unit volume of a capacitor by including a plurality of such unit devices.

SUMMARY

An aspect of the present disclosure is to provide capacitor components advantageous for miniaturization and high capacitance by using a wire-type unit device.

Meanwhile, the purpose of this invention is not limited to the above description, and will be more easily understood in the process of describing the specific embodiments of this invention.

The capacitor component according to an embodiment of the present disclosure may include a first unit device extending in a first direction and including a first central electrode, a first central dielectric surrounding the first central electrode in a direction perpendicular to the first direction, a first outer electrode surrounding the first central dielectric in a direction perpendicular to the first direction, and a first outer dielectric surrounding the first outer electrode in a direction perpendicular to the first direction; a second unit device extending in the first direction and including a second central electrode, a second central dielectric surrounding the second central electrode in a direction perpendicular to the first direction, and a second outer electrode surrounding the second central dielectric in a direction perpendicular to the first direction, and a second outer dielectric surrounding the second outer electrode in a direction perpendicular to the first direction; a body including a capacitance formation portion including the first and second unit devices arranged side by side in a direction perpendicular to the first direction, and first and second surfaces opposing each other in the first direction; a first external electrode disposed on the first surface of the body and connected to the first central electrode and the second outer electrode; and a second external electrode disposed on the second surface of the body and connected to the second central electrode and the first outer electrode.

The capacitor component according to another embodiment of the present disclosure may include a first unit device extending in a first direction and including the first central electrode, the first central dielectric surrounding the first central electrode in a direction perpendicular to the first direction, the first outer electrode surrounding the first central dielectric in the direction perpendicular to the first direction, and the first outer dielectric surrounding the first outer electrode in the direction perpendicular to the first direction; a second unit device extending in the first direction and including the second central electrode, the second central dielectric surrounding the second central electrode in the direction perpendicular to the first direction, and the second outer electrode surrounding the second central dielectric in the direction perpendicular to the first direction, and the second outer dielectric surrounding the second outer electrode in the direction perpendicular to the first direction; a body having a capacitance formation portion including the first and second unit devices arranged side by side in the direction perpendicular to the first direction, and first and second surfaces opposing each other in the first direction; the first external electrode disposed on the first surface of the body and connected to the first central electrode and the second outer electrode; and the second external electrode disposed on the second surface of the body and connected to the second central electrode and the first outer electrode, wherein at least a portion of the first outer dielectric may be in contact with at least a portion of the second outer dielectric to form an outer dielectric.

The capacitor component according to still another embodiment of the present disclosure may include a body having a capacitance formation portion including a first unit device and a second unit device arranged side by side in one direction; and first and second external electrodes disposed on first and second surfaces of the body, respectively, that oppose each other in another direction perpendicular to the one direction, wherein each of the first and second unit devices includes a central electrode, a central dielectric, an outer electrode, and an outer dielectric stacked in order in the one direction from an inner side to an outer side of a corresponding one of the first and second unit devices, and near the first surface of the body, the central electrode of the first unit device extends further in the other direction than the outer electrode of the first unit device, and the outer electrode of the second unit device extends further in the other direction than the central electrode of the second unit device.

As one of various effects of the present disclosure, a capacitor component that is advantageous for miniaturization and high capacitance may be provided as a structure capable of generating capacitance between adjacent unit devices as well as generating capacitance in one unit device is ensured, Meanwhile, the various and beneficial advantages and effects of this invention are not limited to the above, and will be more easily understood in the process of describing the specific embodiment of this invention.

BRIEF DESCRIPTION OF DRAWINGS

The above and other aspects, features, and advantages of the present disclosure will be more clearly understood from the following detailed description, taken in conjunction with the accompanying drawings, in which:

FIG. 713 is an exploded view of a part of the second unit device.

DETAILED DESCRIPTION

Figure 1:
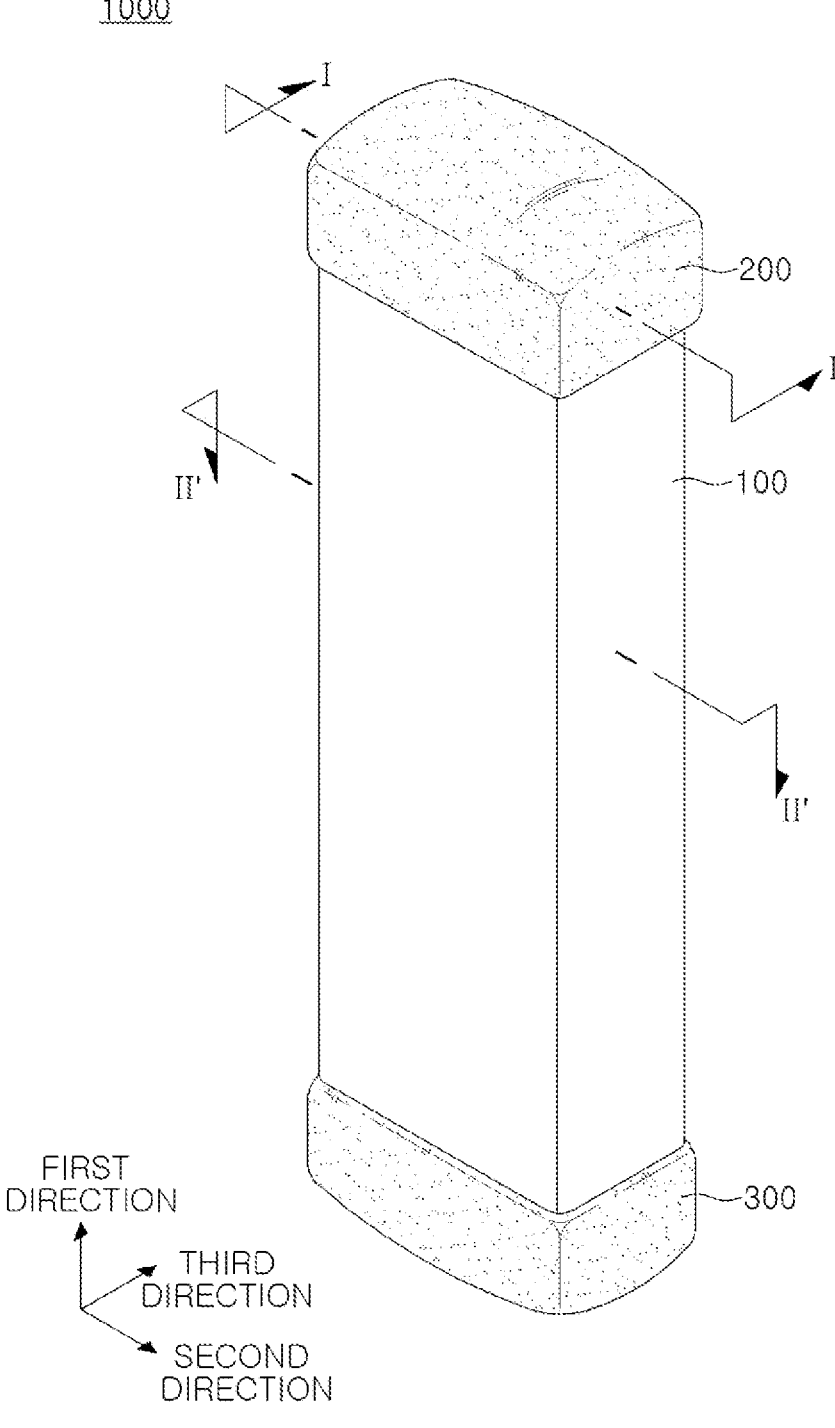
FIG. 1 is a perspective view schematically illustrating a capacitor component according to an embodiment of the present disclosure.

Hereinafter, embodiments of the present disclosure are described with reference to a specific embodiment and the accompanying drawings. However, the embodiments of this disclosure can be modified in various different forms, and the scope of this disclosure is not limited to the embodiments described below. In addition, an embodiment of the present disclosure is provided to more fully explain the present disclosure to a person skilled in the art. Therefore, the shape and size of the elements in the drawing may be exaggerated for clearer explanation, and elements indicated by the same sign in the drawing are the same elements.

In addition, in order to clearly describe this disclosure in the drawings, parts unrelated to the description are omitted, and the sizes and thicknesses of each component illustrated in the drawings are arbitrarily illustrated for convenience of description, and thus this disclosure is not limited to those illustrated. In addition, components with the same function within the same scope of thought are described using the same reference numerals. Furthermore, throughout the specification, when any part "contains" a component, this means that it may contain other components, not exclude other components unless otherwise opposed.

In the figures, the first direction may be defined as a length L direction, the second direction may be defined as a thickness T direction, and the third direction may be defined as a width W direction.

FIG. 1 is a perspective view schematically illustrating a capacitor component according to an embodiment of the present disclosure.

Figure 2:
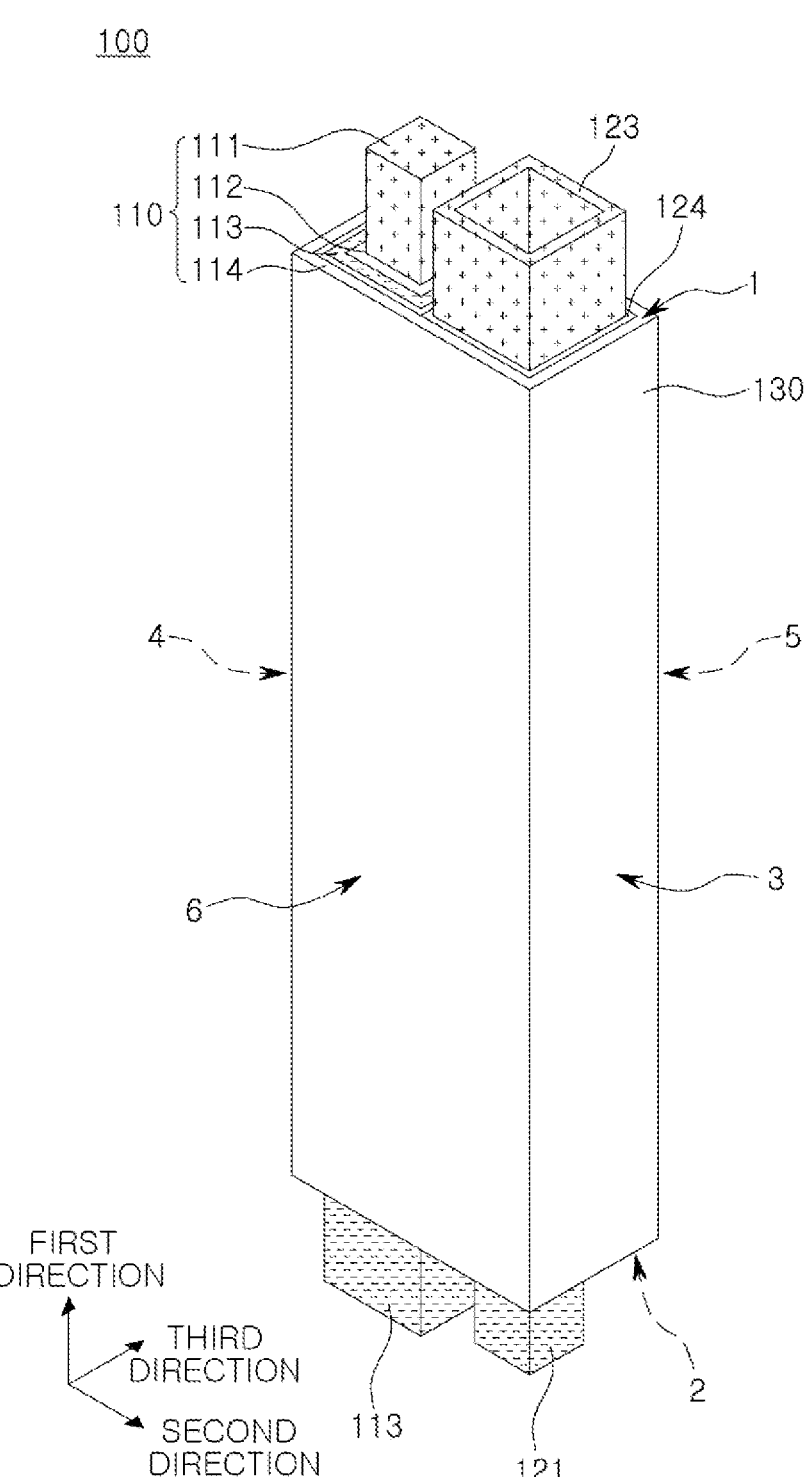
FIG. 2 is a perspective view schematically illustrating a body of the capacitor component.

FIG. 2 is a perspective view schematically illustrating a body of the capacitor component.

Figure 3:
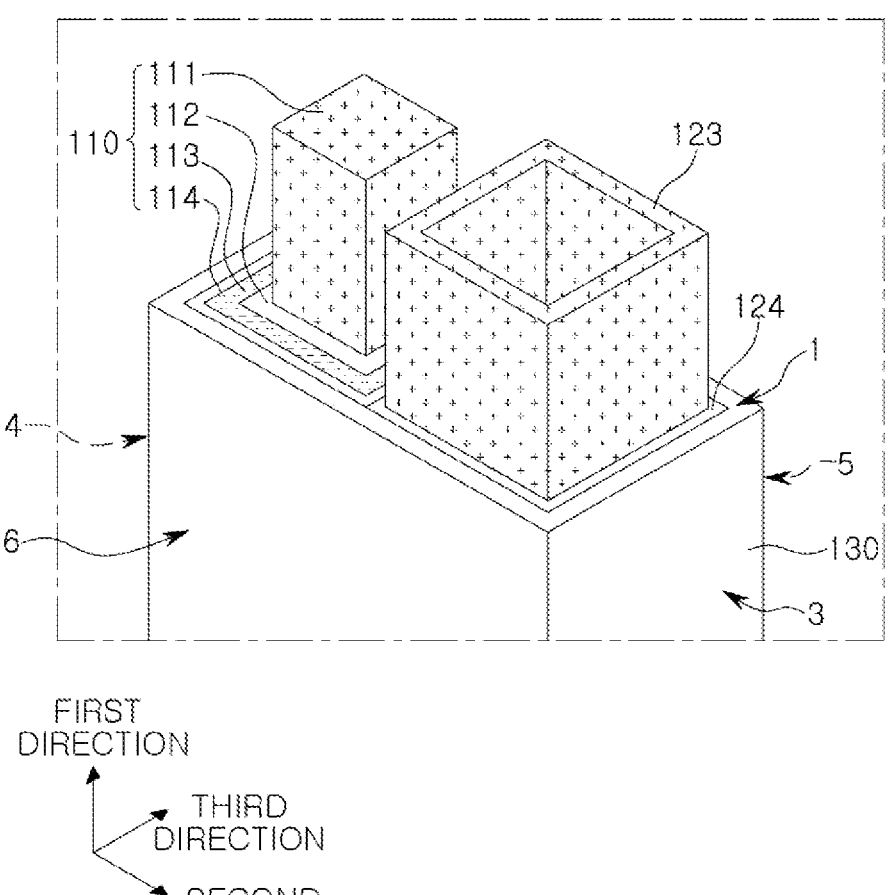
FIG. 3 is an enlarged perspective view of first and second unit devices exposed on a first surface of a body.

FIG. 3 is an enlarged perspective view of first and second unit devices exposed on a first surface of a body.

Figure 4:
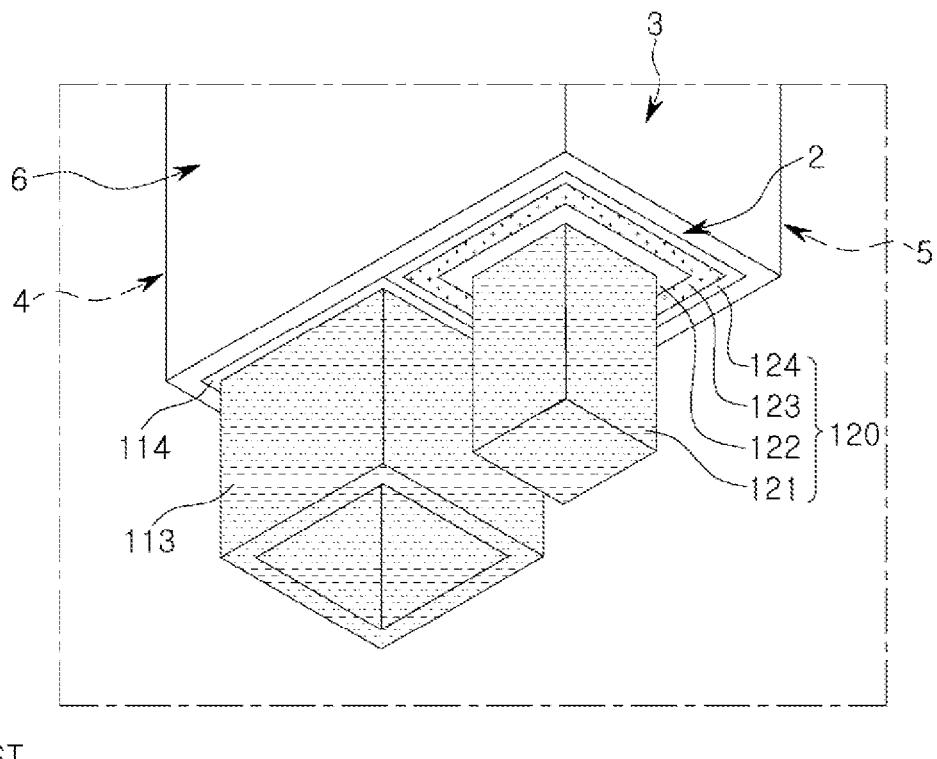
FIG. 4 is an enlarged perspective view of first and second unit devices exposed to the second surface of the body.
Figure 4:
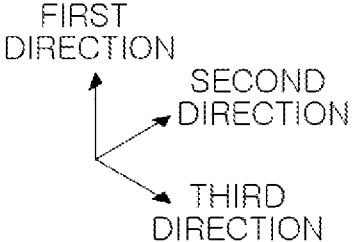

FIG. 4 is an enlarged perspective view of first and second unit devices exposed to the second surface of the body.

Figure 5:
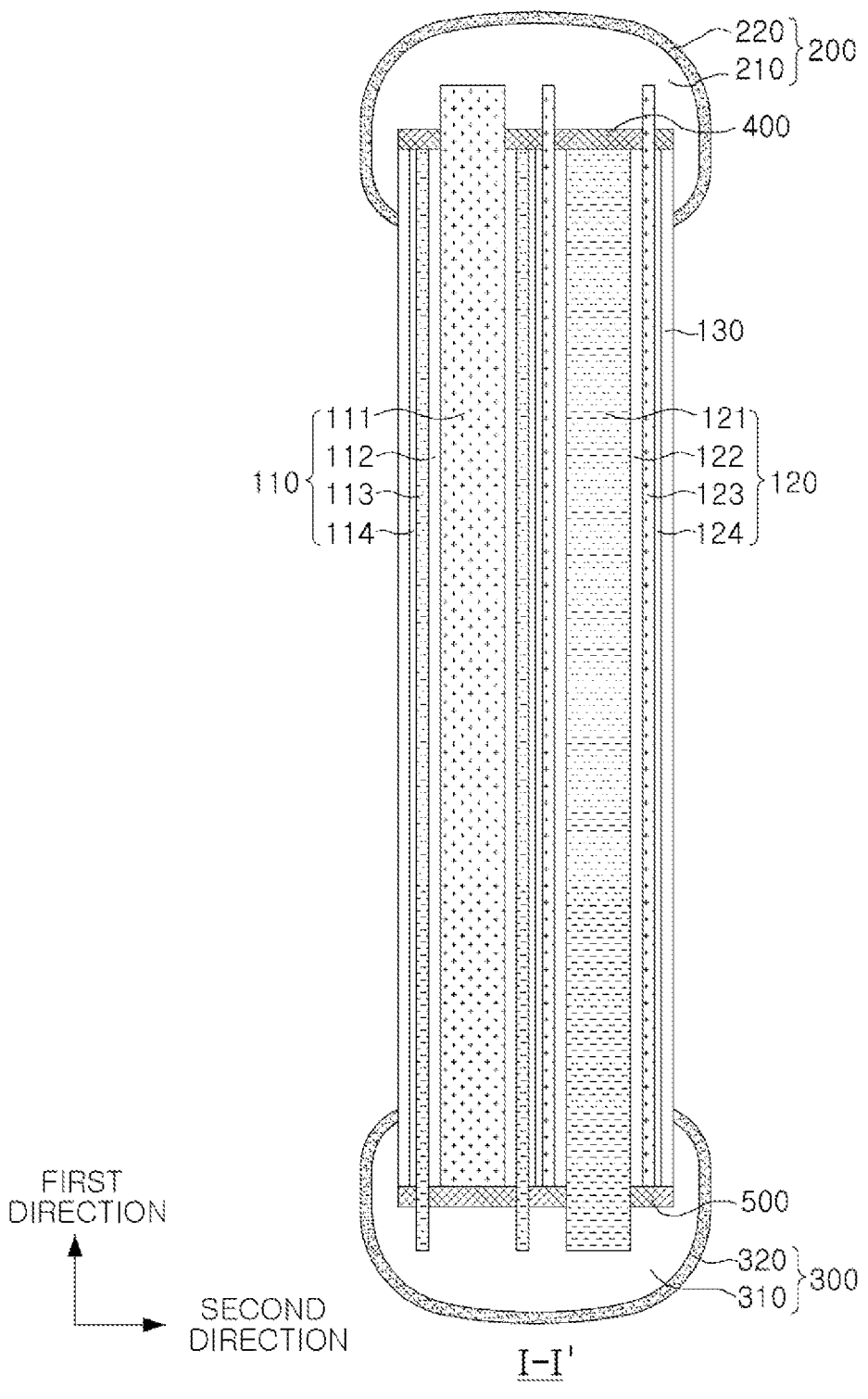
FIG. 5 is a cross-sectional taken along line view I-I' in FIG. 1.

FIG. 5 is a cross-sectional view I-I' in FIG. 1.

Figure 6:
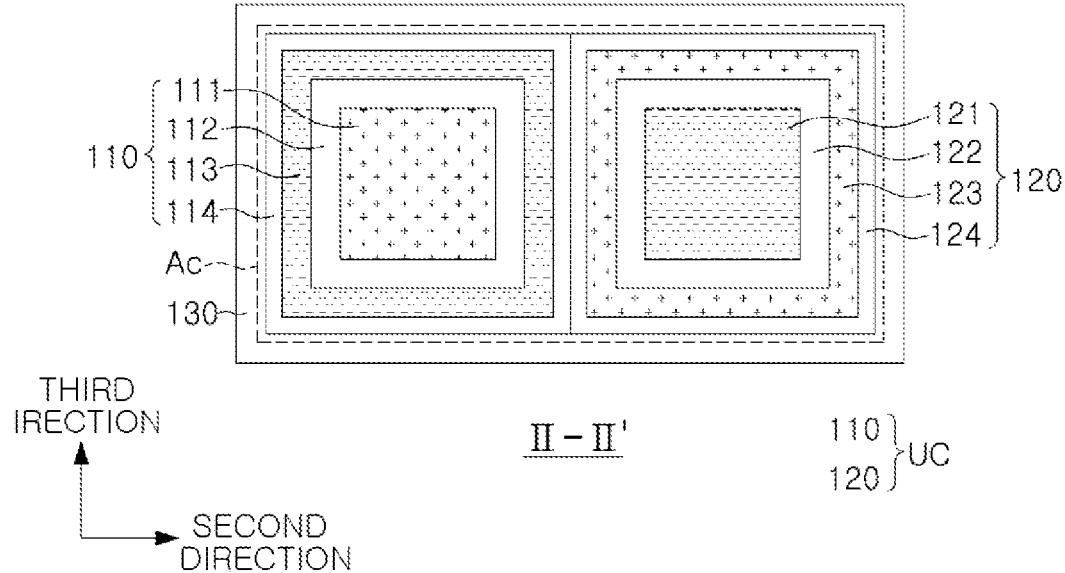
FIG. 6 is a cross-sectional view taken along line II-II' in FIG. 1.

FIG. 6 is a cross-sectional view taken along line II-II' in FIG. 1.

Figures 7A, 7B:
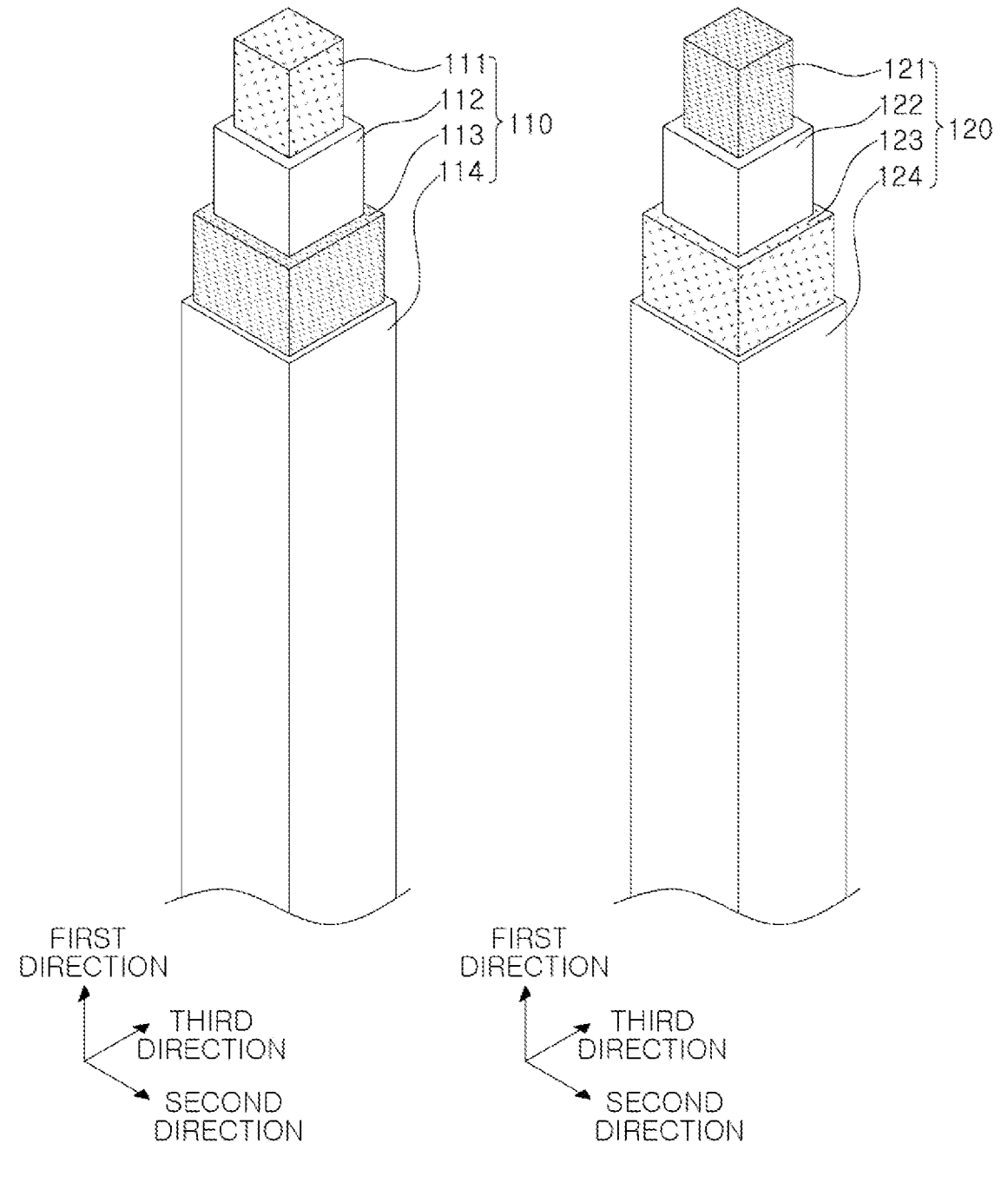
FIG. 7A is an exploded view of a part of the first unit device.

FIG. 7A is an exploded view of a part of the first unit device, and FIG. 713 is an exploded view of a part of the second unit device.

Referring to FIGS. 1 to 7, the capacitor component 1000 according to an embodiment of the present disclosure may include the first unit device 110 including the first central electrode 111, the first central dielectric 112 surrounding the first central electrode 111 in the direction perpendicular to the first direction, the first outer electrode 113 surrounding the first central dielectric 112 in the direction perpendicular to the first direction, and the first outer dielectric 114 surrounding the first outer electrode 113 in the direction perpendicular to the first direction; the second unit device 120 including the second central electrode 121, the second central dielectric 122 surrounding the second central electrode 121 in the direction perpendicular to the first direction, and the second outer electrode 123 surrounding the second central dielectric 122 in the direction perpendicular to the first direction, and the second outer dielectric 124 surrounding the second outer electrode 123 in the direction perpendicular to the first direction; the body 100 including the capacitance formation portion AC including first and second unit devices 110 and 120 arranged side by side in the direction perpendicular to the first direction, and first and second surfaces 1 and 2 opposing each other in the first direction; the first external electrode 200 disposed on the first surface of the body and connected to the first central electrode 111 and the second outer electrode 123; and the second external electrode 300 disposed on the second surface of the body and connected to the second central electrode 121 and the first outer electrode 113.

A multilayer ceramic capacitor (MLCC) is developing in the direction of developing a dielectric with a high dielectric constant while deepening the thinning of the dielectric and internal electrodes. However, stacked capacitors are currently close to the limit of capacitance per unit volume, due to the decrease in BDV (breakdown voltage) due to the thinning and the structural capacitance limit of the area stacking method.

In order to solve this problem, various types of capacitors have been developed, and for example, a capacitor using a wire-type unit device has been developed. The wire-type unit device has a shape in which a dielectric and a metal are alternately coated on a metal wire, and has a structure in which a capacitance per unit volume of a capacitor is improved by including a plurality of such unit devices.

However, when a plurality of unit devices are simply included, capacitance is generated inside the unit devices, and capacitance is not generated between the unit devices, thereby being a limit to capacitance improvement.

On the other hand, according to an embodiment of this invention, since the outer electrode 113 of the first unit device 110 and the outer electrode 123 of the second unit device 120 may have different polarities, capacitance may be generated in each of the first unit device 110 and the second unit device 120 and capacitance may be generated between the first and second unit devices 110 and 120, thereby maximizing capacitance per unit volume.

Hereinafter, each component included in the capacitor component 1000 according to an embodiment of the present disclosure will be described in more detail.

The body 100 includes the capacitance formation portion Ac including first and second unit devices 110 and 120 disposed side by side in a direction perpendicular to the first direction. Although there is no particular limitation on the specific shape of the body 100, as illustrated, the body 100 may have a hexahedral shape or a similar shape.

The body 100 may include first and second surfaces 1 and 2 opposing each other in the first direction, Third and fourth surfaces 3, 4 connected to the first and second surfaces 1 and 2 and opposing each other in the second direction, and fifth and sixth surfaces 5 and 6 connected to the first to fourth surfaces 1, 2, 3 and 4 and opposing each other in the third direction.

In an embodiment, the body 100 may include a molding part 130 surrounding the capacitance formation portion Ac in a direction perpendicular to the first direction. The molding part 130 may cover a side surface of the capacitance formation portion Ac. The molding part 130 may serve to protect the inside of the body 100 from external impacts or foreign substances. However, as described later, since the outer dielectric bodies 114 and 124 may serve to protect the inside of the body 100 from external impacts or foreign substances, the molding part 130 may not be disposed.

The molding part 130 may include, for example, a thermoplastic resin such as polystyrene, vinyl acetate, polyester, polyethylene, polypropylene, polyamide, rubber, acrylic, or the like, a phenol-based, epoxy-based, urethane-based, melamine-based, alkide-based, or the like, a photosensitive resin, a parallene, a SixN, or the like.

The molding part 130 may be formed by, for example, applying a liquid insulating resin, laminating an insulating film, or vapor deposition. In the case of the insulating film, a dry film (DF) including a photosensitive insulating resin, an Ajinomoto Build-up Film (ABF) not including the photosensitive insulating resin, or a polyimide film may be used.

In an embodiment, the body may further include a molding part surrounding the capacitance formation portion, the first and second outer electrode may be disposed on the molding part, the first central electrode 111 and the second outer electrode may protrude from the molding part to be connected to the first external electrode, and the second central electrode and the first outer electrode may protrude from the molding part to be connected to the second external electrode. That is, the outer surface of the body excluding the protruded central electrode and outer electrode may be formed of a molding part. As a result, the inside of the body 100 can be further protected from external impacts or foreign substances, and electrical short circuits can be prevented without disposing a separate insulating film.

The first unit device 110 may include the first central electrode 111, the first central dielectric 112 surrounding the first central electrode 111 in a direction perpendicular to the first direction, the first outer electrode 113 surrounding the first central dielectric 112 in a direction perpendicular to the first direction, and the first outer dielectric 114 surrounding the first outer electrode 113 in a direction perpendicular to the first direction. The second unit device 120 may include the second central electrode 121, the second central dielectric 122 surrounding the second central electrode 121 in a direction perpendicular to the first direction, the second outer electrode 123 surrounding the second central dielectric 122 in a direction perpendicular to the first direction, and the second outer dielectric 124 surrounding the second outer electrode 123 in a direction perpendicular to the first direction.

The first central electrode 111 and the second outer electrode 123 may be connected to the first external electrode 200 on the first surface of the body 100, and the second central electrode 121 and the first outer electrode 113 may be connected to the second external electrode 300 on the second surface. Accordingly, the first central electrode 111 and the first outer electrode 113 may have different polarities, thereby forming capacitance inside the first unit device 110, and the second central electrode 121 and the second outer electrode 123 may have different polarities, thereby forming capacitance inside the second unit device 120. Also, since the first outer electrode 113 may have a polarity different from that of the second outer electrode 123, capacitance can be generated between the first unit device 110 and the second unit device 120, thereby maximizing capacitance per unit volume.

The central electrodes 111 and 121 may have a pillar shape extended in the first direction. The type of the cross-part perpendicular to the first direction of the central electrodes 111 and 121 does not need to be particularly limited, and may be one of a circular type, an oval type, an irregular type, and a polygonal type. According to this, the central electrodes 111 and 121 may be the shape of a circular column, an elliptical column, a triangular column, a square column, a pentagonal column, and a hexagonal column. Also, the cross-sections of the first central electrode 111 and the second central electrode 121 do not need to have the same shapes, and may have different shapes. In addition, when there are a plurality of first unit devices 110 included in the capacitance formation portion Ac, the cross-sections perpendicular to the first direction of the plurality of first central electrodes 111 do not need to have the same shape and may have different shapes. In addition, when there are a plurality of second unit devices 120 included in the capacitance formation portion Ac, the cross-sections perpendicular to the first direction of the plurality of second central electrodes 121 do not need to have the same shape and may have different shapes.

The material for forming the central electrodes 111 and 121 does not need to be particularly limited, and may be formed of at least one of copper (Cu), aluminum (Al), nickel (Ni), lead (Pb), cobalt (Co), tungsten (W), molybdenum (Mo), silver (Ag), tin (Sn), and gold (Au). Also, the first central electrode 111 and the second central electrode 121 do not need to be formed of the same material, but may be formed of different materials. In addition, when there are a plurality of first unit devices 110 included in the capacitance formation portion Ac, the plurality of first central electrodes 111 do not need to be formed of the same material, but may be formed of different materials. In addition, when there are a plurality of second unit devices 120 included in the capacitance formation portion Ac, the plurality of second central electrodes 121 do not need to be formed of the same material, but may be formed of different materials.

The method of forming the central electrodes 111 and 121 does not need to be particularly limited, and may be manufactured by, for example, wire drawing. The wire drawing refers to a processing method in which a metal wire is inserted into a die with a narrow end, and the end is pulled out through a hole of the die to reduce and adjust the diameter of the metal wire.

The size of the central electrodes 111 and 121 does not need to be particularly limited. For example, in the case of the first direction size of the central electrodes 111 and 121, the maximum size in the second direction and the maximum size in the third direction of the central electrodes 111 and 121 may be 10 μm or less, and 2 μm or less, more preferably 0.5 μm or less, considering the miniaturization and capacitance of the capacitor component 1000.

The maximum sizes of the central electrodes 111 and 121 in the second direction and the maximum size in the third direction may be measured based on an optical microscope image or a scanning electron microscope (SEM) image for the second and third direction cross sections taken at the center of the first direction of the capacitor component 1000. When there are multiple first central electrodes 111 and/or second central electrodes 121, after measuring the multiple maximum sizes, the arithmetic averaged value can be calculated as the average maximum size.

The central dielectrics 112 and 122 may be disposed to surround the central electrodes 111 and 121 in a direction perpendicular to the first direction. More specifically, the central dielectrics 112 and 122 may be disposed between the central electrodes 111 and 121 and the outer electrodes 113 and 123, in a form that covers the side surfaces of the central electrodes 111 and 121. That is, the central dielectrics 112 and 122 may serve as a separator for preventing an electrical short-circuit between the central electrodes 111 and 121 and the outer electrodes 113 and 123.

Referring to FIG. 7a, the first central dielectric 112 may be disposed to surround the first central electrode 111 in a direction perpendicular to the first direction, and referring to FIG. 7b, the second central dielectric 122 may be disposed to surround the second central electrode 121 in a direction perpendicular to the first direction.

The central dielectrics 112 and 122 may have a polygonal ring shape in a cross section perpendicular to the first direction. For example, if the cross section perpendicular to the first direction of the central electrodes 111 and 121 is a square, the cross section perpendicular to the first direction of the central dielectrics 112 and 122 may have a square ring shape.

The materials constituting the central dielectrics 112 and 122 do not need to be particularly limited. For example, the central dielectrics 11 and 122 may include at least one oxide selected from tantalum (Ta), titanium (Ti), lanthanum (La), zirconium (Zr), barium (Ba), silicon (Si), aluminum (Al), and hafnium (Hf).

The central dielectrics 112 and 122 may be formed by, for example, vapor deposition such as atomic layer deposition (ALD), chemical vapor deposition (CVD), or the like, but the present disclosure is not limited thereto.

The outer electrodes 113 and 123 may be disposed to surround the central dielectrics 112 and 122 in a direction perpendicular to the first direction. More specifically, the outer electrodes 113 and 123 may be disposed to cover the side surfaces of the central dielectrics 112 and 122. Referring to FIG. 7A, the first outer electrode 113 may be disposed to surround the first central dielectric 112 in a direction perpendicular to the first direction, and referring to FIG. 7b, the second outer electrode 123 may be disposed to surround the second central dielectric 122 in a direction perpendicular to the first direction.

Since the central dielectrics 112 and 122 are disposed between the central electrodes 111 and 121 and the outer electrodes 111 and 123, charges of different polarities are applied to the plurality of central electrodes 111 and 121 and the outer electrodes 113 and 123 to form capacitances in the central dielectrics 112 and 122.

A cross section of the outer electrodes 113 and 123 perpendicular to the first direction may have a polygonal ring shape. For example, if the central electrodes 111 and 121 have a square cross section perpendicular to the first direction, the cross section perpendicular to the first direction of the outer electrodes 113 and 123 may have a square ring shape.

The material for forming the outer electrodes 113 and 123 does not need to be particularly limited, and may be formed of at least one of copper (Cu), aluminum (Al), nickel (Ni), lead (Pb), cobalt (Co), tungsten (W), molybdenum (Mo), silver (Ag), tin (Sn), and gold (Au). In addition, the outer electrodes 113 and 123 do not need to be formed of the same material as the central electrodes 111 and 121, but may be formed of different materials.

The outer electrodes 113 and 123 may be formed by a thin film process such as vapor deposition or a plating process, and may be formed by, for example, atomic layer deposition (ALD), but the present disclosure is not limited thereto.

The outer dielectrics 114 and 124 may be disposed to surround the outer electrodes 113 and 123 in a direction perpendicular to the first direction. More specifically, the outer dielectrics 114 and 124 may be disposed to cover the side surfaces of the outer electrodes 113 and 123. Referring to FIG. 7A, the first outer dielectric 114 may be disposed to surround the first outer electrode 113 in a direction perpendicular to the first direction, and referring to FIG. 7b, the second outer dielectric 124 may be disposed to surround the second outer electrode 123 in a direction perpendicular to the first direction. The outer dielectrics 114 and 124 may serve as a separator for preventing an electrical short-circuit between the first outer electrode 113 and the second outer electrode 123. Also, the outer dielectrics 114 and 124 are disposed between the first outer electrode 113 and the second outer electrode 123, and charges of different polarities are applied to the first outer electrode 113 and the second outer electrode 123 to form capacitances in the outer dielectrics 114 and 124. In addition, when the body 100 does not separately include the molding part 130, the outer dielectrics 114 and 124 may form an outer surface of the body 100 to protect the inside of the body 100 from external impacts or foreign substances.

Meanwhile, both the first and second unit devices 110 and 120 do not need to have the outer dielectric, and if one of the first and second unit devices 110 and 120 has the outer dielectric, the other may not have the outer dielectric. This is because even if only one of the first and second unit devices 110 and 120 has the outer dielectric, an electrical short-circuit between the first outer electrode 113 and the second outer electrode 123 may be prevented.

The outer dielectrics 114 and 124 may have a polygonal ring shape in the cross section perpendicular to the first direction. For example, if the central electrodes 111 and 121 have a square cross section perpendicular to the first direction, the cross section perpendicular to the first direction of the outer dielectrics 114 and 124 may have a square ring shape.

The materials constituting the outer dielectrics 114 and 124 do not need to be particularly limited. For example, the outer dielectrics (114 and 124) may include at least one oxide selected from tantalum (Ta), titanium (Ti), lanthanum (La), zirconium (Zr), barium (Ba), silicon (Si), aluminum (Al), and hafnium (Hf). In addition, the outer dielectrics 114 and 124 do not need to be formed of the same material as the central dielectrics 112 and 122, and may be formed of different materials. That is, in an embodiment, dielectric materials of the first and second central dielectrics 112 and 122 may be different from dielectric materials of the first and second outer dielectrics 114 and 124.

The outer dielectrics 114 and 124 may be formed by vapor deposition such as atomic layer deposition (ALD), chemical vapor deposition (CVD), or the like, but the present disclosure is not limited thereto.

In an embodiment, the first outer dielectric 114' and the second outer dielectric 124' may be disposed to be in contact with at least a part thereof to form an outer dielectric OD.

Figure 26:
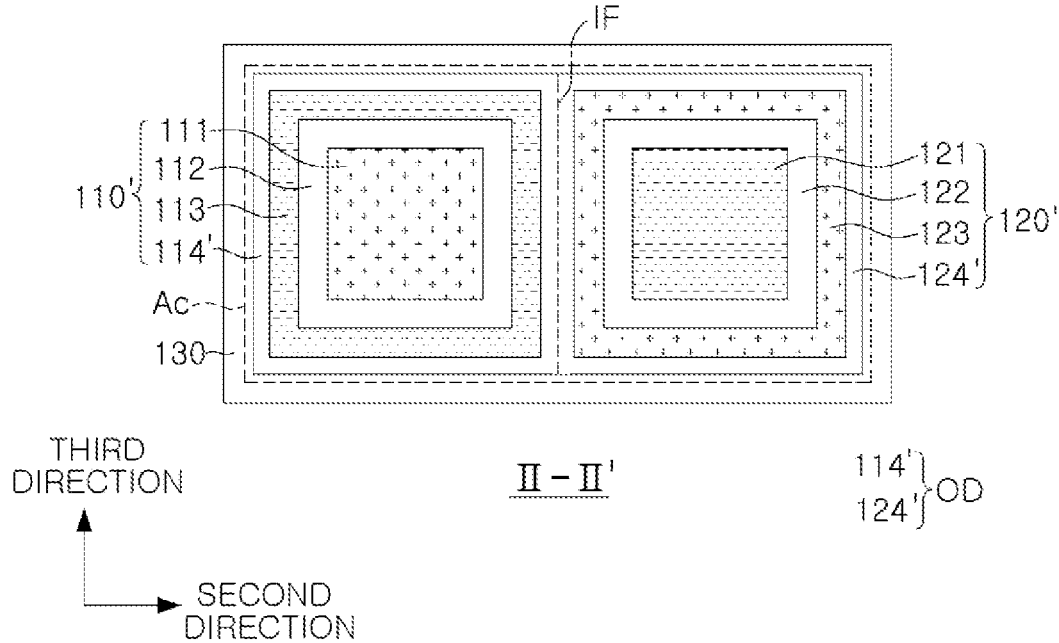
FIG. 26 is a modified embodiment, and is a diagram corresponding to FIG. 6 of an embodiment in which a first outer dielectric and a second outer dielectric form an outer dielectric.

Referring to FIG. 26, in a region where the first outer dielectric 114' of the first unit device 110' and the second outer dielectric 124' of the second unit device 120' contact each other, since the boundary IF of the first outer dielectric 114' and the second outer dielectric 124' is integrated to the extent that it is difficult to confirm without using a scanning electron microscope (SEM), and the first outer dielectric 114' and the second outer dielectric 124' may form an outer dielectric OD.

The average thicknesses of the central dielectrics 112 and 122, the outer electrodes 113 and 123, and the outer dielectrics 114 and 124 does not need to be particularly limited. For example, the average thickness of the central dielectrics 112 and 122, the outer electrodes 113 and 123, and the outer dielectrics 114 and 124 may be 0.5 μm or less, and 0.1 μm or less, and more preferably 0.05 μm, respectively, considering the miniaturization and high capacitance of the capacitor component 1000. Meanwhile, considering that the first and second outer dielectrics 114 and 124 all are disposed between the first and second outer electrodes 113 and 123, the average thickness of each of the first and second outer dielectrics 114 and 124 may be thinner than the average thickness of the central dielectrics 112 and 122 and/or outer electrodes 113 and 123. For example, the average thickness of the outer dielectrics 114 and 124 may be half or less of the average thickness of the central dielectrics 112 and 122 and/or the outer electrodes 113 and 123.

The average thicknesses of the central dielectrics 112 and 122, outer electrodes 113 and 123, and outer dielectrics 114 and 124 may mean that any one central dielectric 112 and 122, outer electrodes 113 and 123, and outer dielectrics 114 and 124 illustrated in the image are measured multiple times in a direction perpendicular to the first direction, respectively, and these calculate as arithmetic average, based on the optical microscope image or scanning electron microscope image of the second and third direction cross sections taken at the center of the first direction of the capacitor component 1000. Alternatively, it may mean that for each of at least three central dielectrics 112 and 122, outer electrodes 113 and 123, and outer dielectrics 114 and 124 illustrated in the image, the average thickness is calculated as the method described above, and these are calculated as arithmetic average, respectively.

In an embodiment, the first direction dimension of the first unit device 110 may be 10 times or more larger than the maximum dimension of the first unit device 110 in the cross section perpendicular to the first direction, and the first direction dimension of the second unit device 120 may be 10 times or more larger than the maximum dimension of the second unit device 120. That is, the first and second unit devices 110 and 120 may have a wire shape, and accordingly, it may be easy to arrange multiple first and second unit devices. However, the present disclosure is not limited thereto, and if necessary, the dimension of the first unit device 110 in the first direction may be smaller than the maximum dimension of the first unit device 110 in the cross section perpendicular to the first direction, and the dimension of the second unit device 120 in the first direction can be smaller than the maximum dimension of the second unit device 120 in a cross part perpendicular to the first direction.

In an embodiment, in the cross section of the first unit device 110 perpendicular to the first direction, the shapes having the outer sides of the first central electrode 111, the first central dielectric 112, the first outer electrode 113, and the first outer dielectric 114 may be substantially identical, but may be different in the size, and in the cross section of the second unit device 120 perpendicular to the first direction, the shapes having the outer sides of the second central electrode 121, the second central dielectric 122, the second outer electrode 123, and the second outer dielectric 124 may be substantially identical, but may be different in the size.

The external electrodes 200 and 300 are disposed on the first and second surfaces 1 and 2 of the body 100, and may extend to a part of each of the third to sixth surfaces 3, 4, 5, and 6. The external electrodes 200 and 300 may include the first external electrode 200 disposed on the first surface and connected to the first central electrode 111 and the second outer electrode 123, and a second external electrode 300 disposed on the second surface and connected to the second central electrode 121 and the first outer electrode 113.

The external electrodes 200 and 300 may be formed of any material having electrical conductivity, such as a metal, a specific material may be determined in consideration of electrical characteristics, structural stability, and the like, and may have a multi-layered structure.

The external electrodes 200 and 300 may include, for example, first electrode layers 210 and 310 and second electrode layers 220 and 320 sequentially formed from the first and second surfaces 1 and 2 of the body 100.

The first electrode layers 210 and 310 may be formed, for example, by dipping first and second surfaces 1 and 2 of the body 100 into a conductive paste for an external electrode including a conductive metal and glass, and then firing the same. Alternatively, it may be formed by transferring a sheet including the conductive metal and glass. Accordingly, the external electrodes 131 and 132 may be fired electrodes including the conductive metal and glass.

In addition, the first electrode layers 210 and 310 may be, for example, a resin-based electrode including a conductive metal and a resin. The first electrode layers 210 and 310 may be formed by applying and curing a paste including the conductive metal and the resin.

The conductive metal included in the first electrode layers 210 and 310 may include, for example, copper (Cu), nickel (Ni), palladium (Pd), platinum (Pt), gold (Au), silver (Ag), lead (Pb), and/or an alloy including them, and preferably, including copper (Cu) and/or nickel (Ni), but the present disclosure is not limited thereto.

Furthermore, the first electrode layers 210 and 310 may be formed of a plurality of layers. For example, the first electrode layers (210, 310) may have a form in which the resin-based electrode including the conductive metal and the resin is disposed on the fired electrode including the conductive metal and glass.

The second electrode layers 220 and 320 may improve mounting characteristics. The type of the second electrode layers 220 and 320 is not particularly limited, and may be a plating layer including nickel (Ni), tin (Sn), palladium (Pd), an alloy including the same, or the like, and may be formed of a plurality of layers. The second electrode layers 220 and 320 may be, for example, a nickel (Ni) plating layer or a tin (Sn) plating layer, and the nickel (Ni) plating layer and the tin (Sn) plating layer are sequentially formed. In addition, the second electrode layers 220 and 320 may include a plurality of nickel (Ni) plating layers and/or a plurality of tin (Sn) plating layers.

In an embodiment, the first central electrode 111 and the second outer electrode 123 may protrude from a first surface 1 of the body 100, and the second central electrode 121 and the first outer electrode 113 may protrude from the second surface 2 of the body 100.

The first central electrode 111 and the second outer electrode 123 protrude from the first surface 1 of the body 100 to be connected to the first external electrode 200, and the second central electrode 121 and the first outer electrode 113 protrude to the second surface 2 of the body 100 to be connected to the second external electrode 300, and as a result, a contact area among the central electrodes 111 and 121 and the outer electrodes 113 and 123 and the external electrodes 200 and 300 is increased, thereby improving a connectivity among the central electrodes 111 and 121 and the outer electrodes 113 and 123 and the external electrodes 200 and 300.

One end of one direction of the first and second unit devices 110 and 120 may be etched to selectively remove the first central dielectric 112, the first outer electrode 113, the first outer dielectric 114, the second central electrode 121, and the second outer dielectric 124, thereby protruding the first central electrode 111 and the second outer electrode 123. In the same point of view, the other end of one direction of the first and second unit devices 110 and 120 may be etched to selectively remove the first central electrode 111, the first central dielectric 112, the first outer dielectric 114, the second central dielectric 122, the second outer electrode 123, and the second outer dielectric 124, thereby protruding the second central electrode 121 and the first outer electrode 113. However, the present disclosure is not limited thereto.

The first and second central electrodes 111 and 121, the first and second central dielectrics 112 and 122, the first and second outer electrodes 113 and 123, and the first and second outer dielectrics 114 and 124 may be selectively removed by different etching solutions, respectively.

Accordingly, in an embodiment, the metal included in the first central electrode 111 and the second outer electrode 123 may preferably include a metal different from the metal included in the second central electrode 121 and the first outer electrode 113.

For example, in an embodiment, the first and second central electrodes 111 and 121, and the first and second outer electrodes 113 and 123 may include at least one of copper (Cu), aluminum (Al), nickel (Ni), lead (Pb), cobalt (Co), tungsten (W), molybdenum (Mo), silver (Ag), and gold (Au), but the metal included in the first central electrode 111 and the second outer electrode 123 may be a metal different from the metal included in the second central electrode 121 and the first outer electrode 113.

However, the present disclosure is not limited thereto, and there may be a method of performing etching separately rather than etching the first and second unit devices 110 and 120 at once, and in the step of manufacturing the first and second unit devices 110 and 120, respectively, a desired electrode may be manufactured to have a protruding shape. Accordingly, it is also possible to form the same material as the central electrodes 111 and 121 and the outer electrodes 113 and 123.

In an embodiment, a first insulating film 400 covering the second central electrode 121 and the first outer electrode 113 may be disposed between the first external electrode 200 and the first surface, and a second insulating film 500 covering the first central electrode 111 and the second outer electrode 123 may be disposed between the second external electrode 300 and the second surface.

The capacitor component 1000 may include insulating films 400 and 500, thereby improving the mechanical durability of the capacitor component 1000, improving the electrical insulation characteristics among the second central electrode 121, the first outer electrode 113, and the first external electrode 200, and improving the electrical insulation characteristic among the first central electrode 111, the second outer electrode 123, and the second external electrode 300 can be improved.

The insulating films 400 and 500 may include a material having electrical insulation, and the material is not particularly limited. For example, the insulating films 400 and 500 may include at least one of resin and ceramic. The resin may include, for example, a thermoplastic resin, a thermosetting resin, and/or a photosensitive resin, but the present disclosure is not limited thereto. The ceramic may include, for example, at least one oxide selected from tantalum (Ta), titanium (Ti), lanthanum (La), zirconium (Zr), barium (Ba), silicon (Si), and hafnium (Hf), but the present disclosure is not limited thereto.

The insulating films 400 and 500 may be formed by applying a liquid insulating resin or vapor deposition such as atomic layer deposition (ALD), chemical vapor deposition (CVD), or the like, but the present disclosure is not limited thereto.

Figure 8:
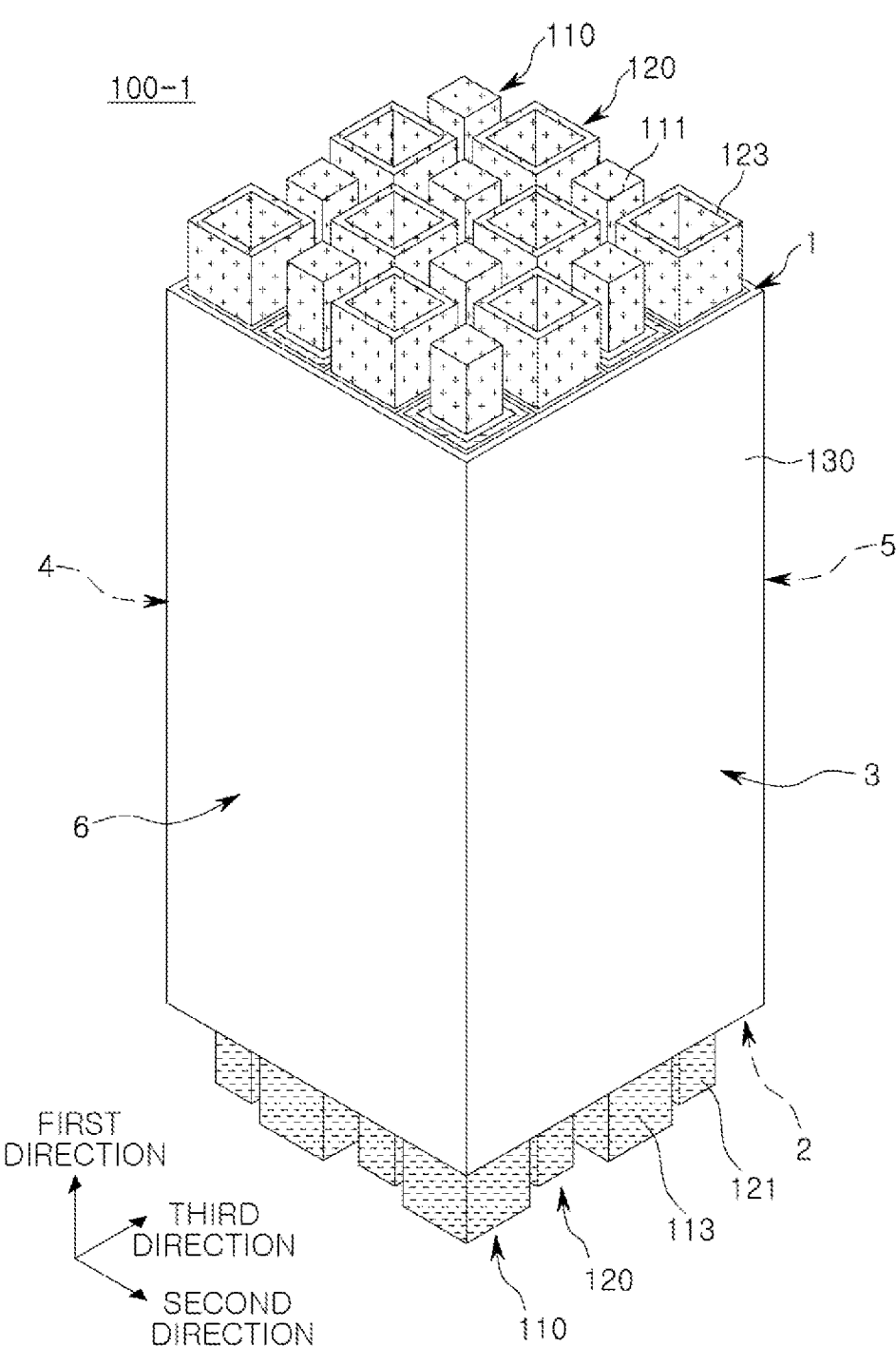
FIG. 8 is a modified embodiment and is a diagram corresponding to FIG. 2 of an embodiment in which a plurality of first and second unit devices are respectively provided.
Figure 9:
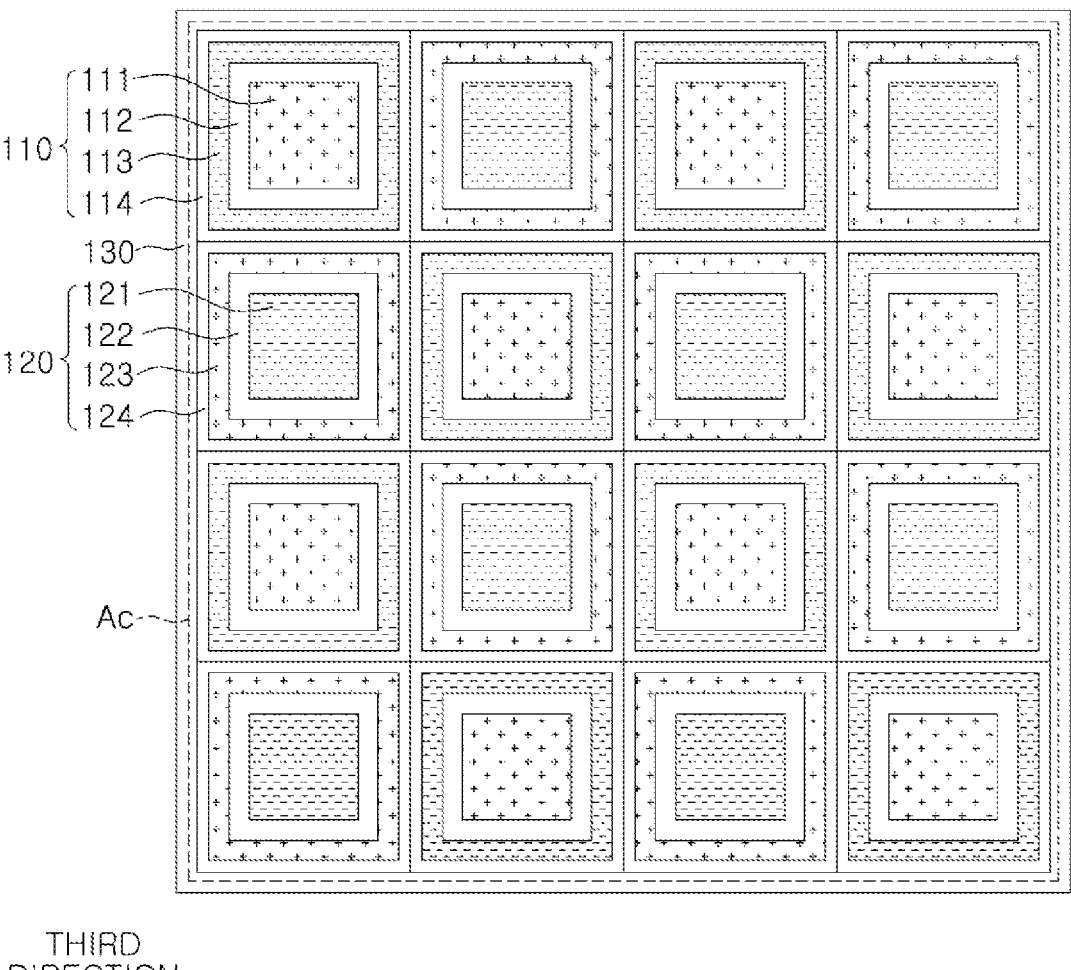
FIG. 9 is a modified embodiment and is a diagram corresponding to FIG. 6 of an embodiment in which a plurality of first and second unit devices are respectively provided.
Figure 9:

FIG. 8 is a modified embodiment, the FIG. corresponding to FIG. 2 with respect to an embodiment in which a plurality of first unit devices and a plurality of second unit devices are respectively, and FIG. 9 is the figure corresponding to FIG. 6.

In an embodiment, the capacitance formation portion Ac may include a plurality of the first unit devices 110 and a plurality of second unit devices 120, and the plurality of first and second unit devices 110 and 120 may be alternately arranged in a second direction perpendicular to the first direction. In addition, as illustrated in FIGS. 8 and 9, the capacitance formation portion Ac included in the body 100-1 includes a plurality of the first and second unit devices 110 and 120, respectively, and the plurality of first and second unit devices 110 and 120 may be alternately arranged in the second direction perpendicular to the first direction, and may be alternately disposed in the third direction perpendicular to the first and second directions. Accordingly, capacitance may be formed in the outer dielectrics 114 and 124 disposed between the adjacent first and second unit devices 110 and 120, thereby maximizing capacitance per unit volume.

In an embodiment, in the cross section perpendicular to the first direction, the first unit device 110 may be one of a circle shape, an ellipse shape, an irregular shape, and a polygonal shape, and the second unit device 120 may be one of a circle shape, an ellipse shape, an irregular shape, and a polygonal shape. That is, the first unit device 110 may be in the form of a circular column, an elliptical column, a triangular column, a pentagonal column, a hexagonal column, etc., and the second unit device 120 does not need to have the same shape.

In an embodiment, in the cross section perpendicular to the first direction, the first unit device 110 may be a polygonal shape, and the second unit device 120 may be a polygonal shape. When the first unit device 110 is a polygonal shape and the second unit device 120 is a polygonal shape, a space between the first unit device 110 and the second unit device 120 may be minimized, thereby improving packing density and further improving a capacitance per unit volume of a capacitor component.

In this case, one side of the first unit device 110 may be disposed to face one side of the second unit device 120 and be in contact with the other side. Accordingly, packing density may be further improved. That is, the first unit device 110 and the second unit device 120 may be disposed to be in surface contact with each other. Here, being arranged to be in surface contact with each other may mean that one surface of the first unit device 110 is in contact with one surface of the second unit device 120.

In an embodiment, one side of the first unit device 110 and one side of the second unit device 120 opposing each other may have substantially the same length. Accordingly, there may be substantially no space except for the first and second unit devices 110 and 120 in the capacitance formation portion Ac, and thus packing density may be further improved.

In an embodiment, when the first and second unit devices adjacent to each other are referred to as unit capacitance portion (UC), the unit capacitance part (UC) may have a rectangular shape in the cross section perpendicular to the first direction. Accordingly, there may be substantially no space except for the first and second unit devices 110 and 120 in the capacitance formation portion Ac, and thus packing density may be further improved.

Meanwhile, when the capacitance formation portion Ac includes a plurality of first and second unit devices 110 and 120, each of the plurality of first and second unit devices 110 and 120 is alternately disposed in a second direction perpendicular to the first direction, in the cross section perpendicular to the first direction, one side of the first unit device is in contact with one side of the second unit device while facing each other, and all sides of the first unit device are not in contact with the one side of another first unit device, in a state in which it faces the one side of the another first unit device.

Accordingly, capacitance may be formed in all outer dielectrics 114 and 124 disposed between the adjacent first and second unit devices 110 and 120, thereby maximizing capacitance per unit volume.

In this case, in the cross section perpendicular to the first direction, one side of the first unit device 110 except for the outer side of the capacitance formation portion Ac may be in contact with one side of the second unit device 120 while facing each other, and one side of the second unit device 120 except the outer side of the capacitance formation portion Ac may be in contact with one side of the first unit device 110 while facing each other.

Accordingly, not only packing density can be further improved, but capacitance (capacitance) can be formed in all peripheral dielectric units 114 and 124 arranged between adjacent first and second unit devices 110 and 120, thereby maximizing capacitance per unit volume.

In this case, one side of the first unit device 110 opposing each other and one side of the second unit device 120 may have substantially the same length. Accordingly, there may be substantially no space except for the first and second unit devices 110 and 120 in the capacitance formation portion Ac, and thus packing density may be further improved.

Figure 10:
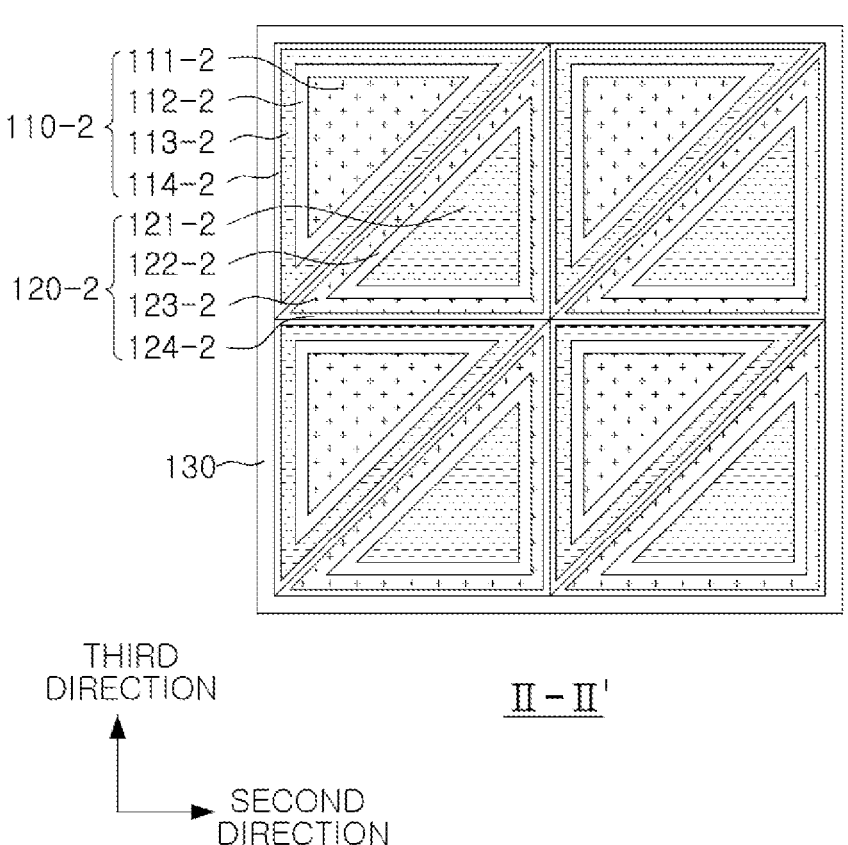
FIG. 10 is a modified embodiment and is a diagram corresponding to FIG. 6 of an embodiment in which cross sections of the first and second unit devices are triangular.

FIG. 10 is a modified embodiment, and is the figure corresponding to FIG. 6 of an embodiment in which cross sections of the first and second unit devices 110-2 and 120-2 are triangular shape. Referring to FIG. 10, in the cross section perpendicular to the first direction, the first and second unit devices 110-2 and 120-2 may be a triangle. When the cross-sections of the first and second unit devices 110-2 and 120-2 are triangular shape, the packing density of the first and second unit devices 110-2 and 120-2 inside the body 100-2 may be improved, thereby making it advantageous to miniaturize and increase capacitance of capacitor components. The cross sections of the first and second unit devices 110-2 and 120-2 may be triangular shape, and can be, for example, an equilateral triangle shape, a right triangle shape, or an isosceles triangle shape.

In this case, when the first and second unit devices adjacent to each other are referred to as unit capacitance portions (UC), the unit capacitance portions (UC) may have a rectangular shape in a cross part perpendicular to the first direction. Accordingly, when a plurality of unit capacitance portions UC are disposed, it may be easy to improve packing density in the capacitance formation portion Ac.

For example, one of the first and second unit devices 110-2 and 120-2 adjacent to each other as in FIG. 10 may have a triangular shape in a cross section perpendicular to the first direction, and the other may have an inverted triangular shape in the cross section perpendicular to the first direction. Accordingly, the packing density of the unit devices 110-2 and 120-2 disposed in the body 100-2 is increased, and it may be advantageous for miniaturization and high capacitance of capacitor parts.

Figure 11:
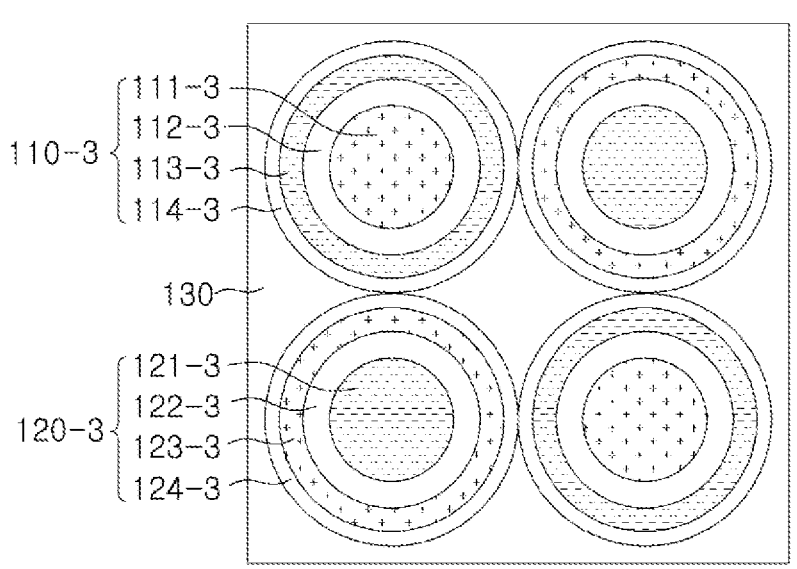
FIG. 11 is a modified embodiment and is a view corresponding to FIG. 6 of an embodiment in which cross sections of the first and second unit devices are circular.

FIG. 11 is a modified embodiment, and is the figure corresponding to FIG. 6 of an embodiment in which cross sections of the first and second unit devices 110-3 and 120-3 are circular. When the cross-sections of the first and second unit devices 110-3 and 120-3 are circular, the space excluding the first and second unit devices 110-3 and 120-3 in the body 100-3 increases, and thus the packing density may be reduced, but according to the present disclosure, since capacitance may also be formed in the outer dielectrics 114 and 124 disposed between the adjacent first and second unit devices 110 and 120, a reduction in capacitance per unit volume may be supplemented by a decrease in packing density.

Figure 12:
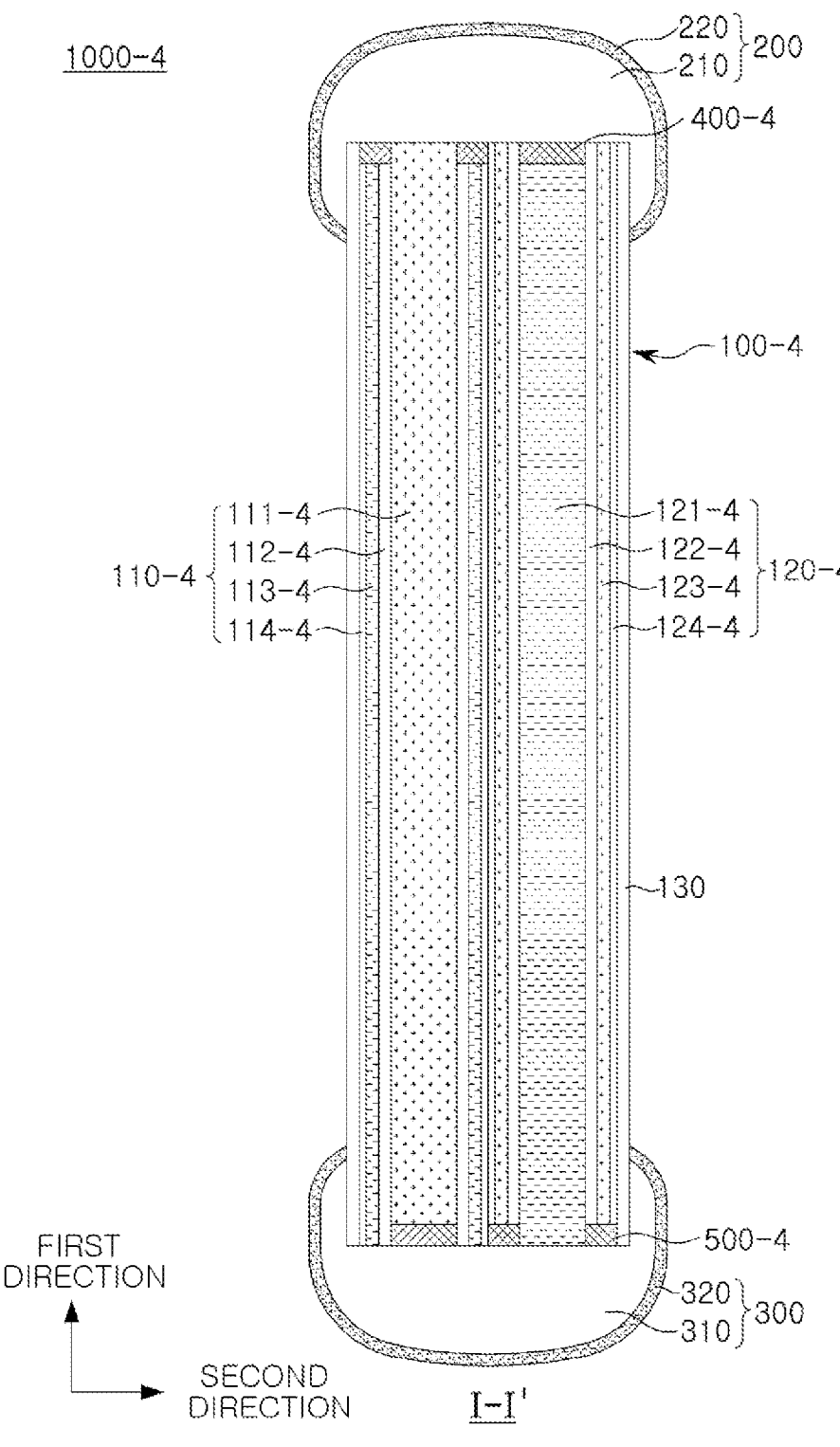
FIG. 12 is a modified embodiment and is a view corresponding to FIG. 6 of an embodiment in which the first and second unit devices have a negative shape.

FIG. 12 is a modified embodiment, and is the figure corresponding to FIG. 5 of an embodiment in which the first and second unit devices have an anode shape. In the capacitor component 1000-4 according to a modified embodiment, the first central electrode 111-4 and the second outer electrode 123-4 may be connected to the first surface and disposed to be spaced apart from the second surface, and the second central electrode 121-4 and the first outer electrode 113-4 may be connected to the second surface and disposed to be spaced apart from the first surface.

The second central electrode 121-4 and the first outer electrode 113-4 may be selectively removed by etching one end opposing each other in the first direction of the first and second unit devices, and the first central electrode 111-4 and the second outer electrode 123-4 are selectively removed by etching the other ends of the first and second unit devices opposing each other in the first direction, thereby being able to obtain the structure. Accordingly, for a simpler process, the first central electrode 111-4 and the second outer electrode 123-4 may be connected to the first external electrode 200, and the second central electrode 121-4 and the first outer electrode 113-4 may be connected to the second external electrode 300.

In this case, a first insulating film 400-4 may be disposed in a space where the second central electrode 121-4 and the first outer electrode 113-4 are spaced apart from the first surface, and a second insulating film 500-4 may be disposed in a space where the first central electrode 111-4 and the second outer electrode 123-4 are spaced apart from the second surface.

The capacitor component 1000-4 includes the insulating films 400-4 and 500-4, thereby improving mechanical durability of the capacitor component 1000-4, improving electrical insulation characteristics among the second central electrode 121-4, the first outer electrode 113-4 and the first external electrode 200, and improving electrical insulation characteristics among the first central electrode 111-4, the second outer electrode 123-4, and the second external electrode 300.

Figure 13:
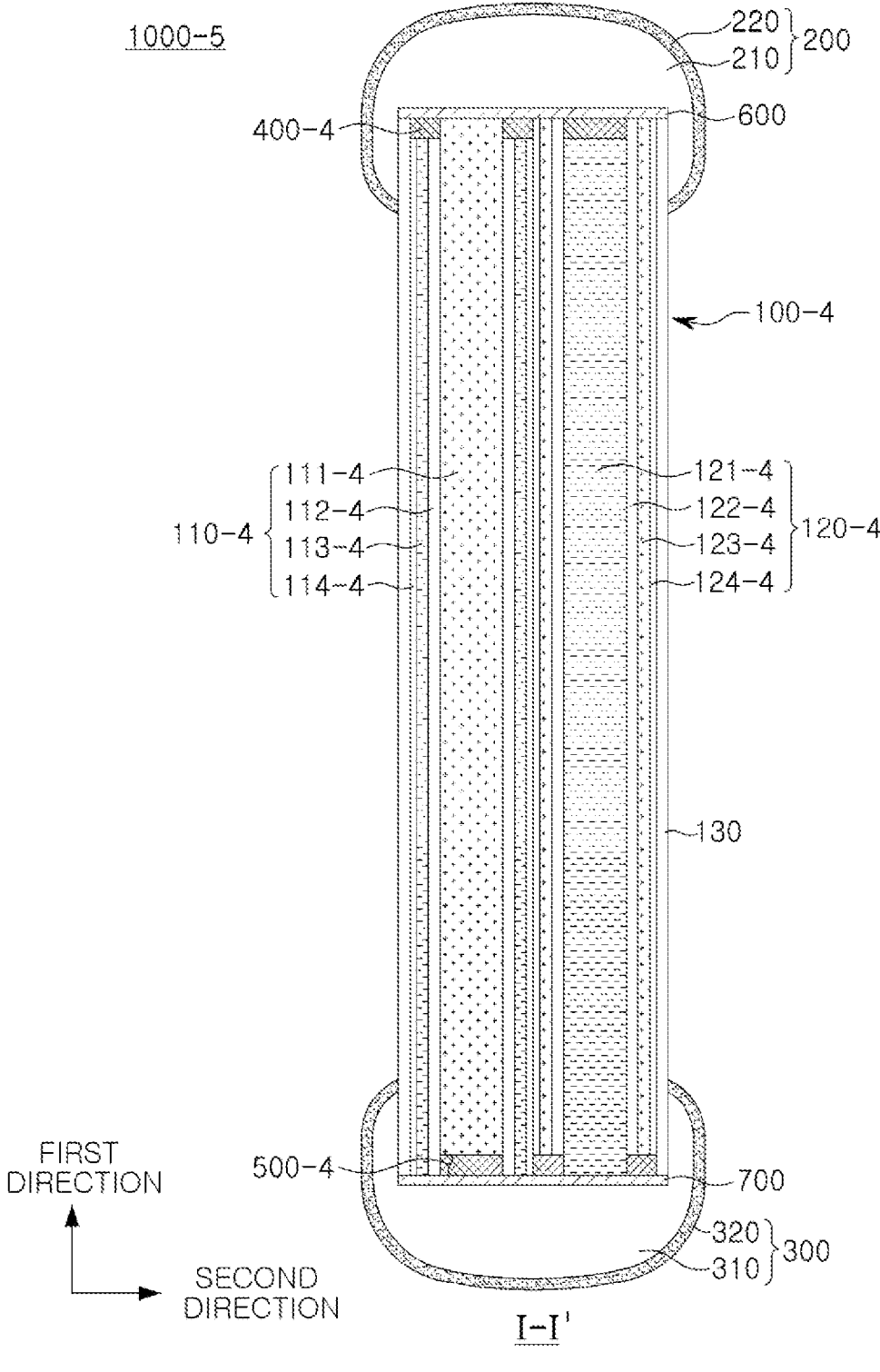
FIG. 13 is a modified embodiment to FIG. 5 of an embodiment further including first and second connection electrodes.

FIG. 13 is a modified embodiment, and is the figure corresponding to FIG. 5 of an embodiment further including first and second connection electrodes 600 and 700. In the capacitor component 1000-5 according to an embodiment, the first connection electrode 600 may be disposed between the first external electrode 200 and the first surface, and the second connection electrode 700 may be disposed between the second external electrode 300 and the second surface.

In this case, the first and second connection electrodes 600 and 700 may be a plating layer or a sputtering layer. Since the capacitor component 1000-5 according to an embodiment does not have the central electrodes 111-4 and 121-4, and the outer electrodes 113-4 and 123-4, protruding from the first and second surfaces, a plating layer or a sputtering layer may be uniformly formed on the first and second surfaces of the body 100-4, thereby improving electrical connection.

The connection electrodes 600 and 700 may include, for example, one or more of nickel (Ni), copper (Cu), gold (Au), chromium (Cr), and an alloy thereof, and the connection electrodes 600 and 700 may be formed by known plating method or sputtering method.

In addition, the first and second connection electrodes 600 and 700 may substantially consist of metal.

Figure 14:
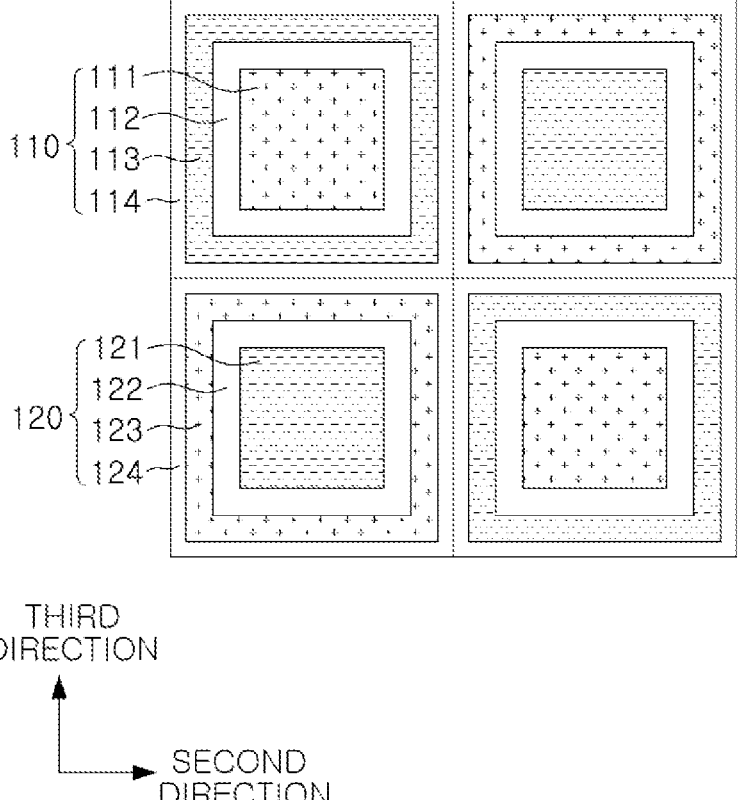
FIG. 14 illustrates a partial view of the capacitance formation portion of the invention embodiment.
Figure 15:
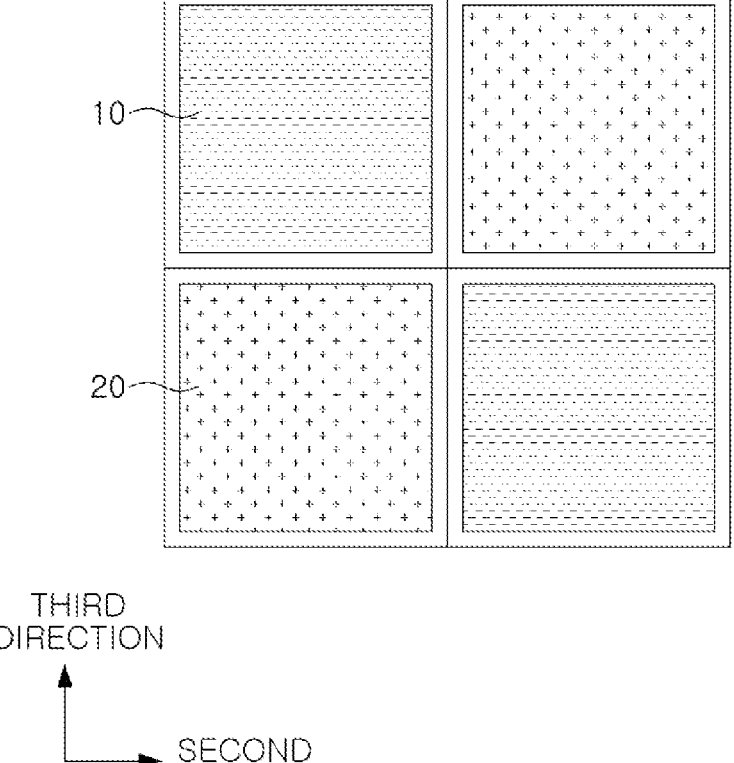
FIG. 15 illustrates a partial view of the capacitance formation portion of comparative embodiment 1.
Figure 16:
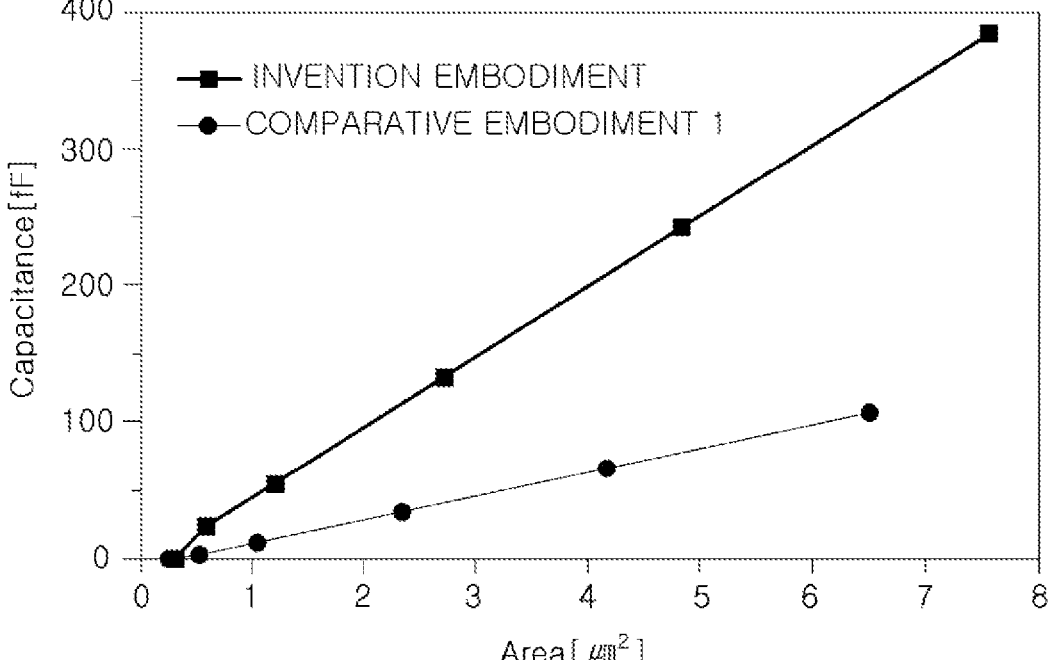
FIG. 16 is a graph showing capacitances according to the area of the unit devices of Invention embodiment and comparative embodiment 1.

FIG. 14 is a cross-sectional view of a capacitance formation portion of invention embodiment, FIG. 15 is a cross-sectional view of the capacitance formation portion of comparative embodiment 1, and FIG. 16 is a graph illustrating capacitances according to an area of the unit devices of the invention embodiment and comparative embodiment 1.

Referring to FIG. 15, in the case of the comparative embodiment 1, the unit devices 10 and 20 were formed only with the center electrode, were alternately arranged in the second and third directions, and the first and second unit devices 10 and 20 had different polarities.

Referring to FIG. 16, it may be seen that the areas of the capacitance formation portions of the invention embodiment and comparative embodiment 1 are increased, and the capacitance difference of the invention embodiment is gradually increased, and regardless of the area, the capacitance of the invention embodiment is about three times higher than the capacitance of the comparative Example 1.

Figure 17:
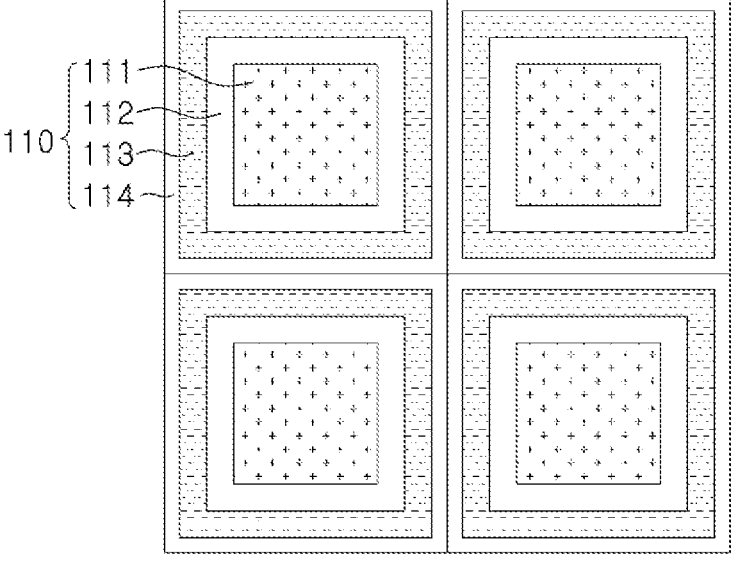
FIG. 17 is a partial view of the capacitance formation portion of comparative embodiment 2.
Figure 17:
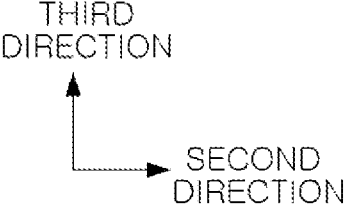
Figure 18:
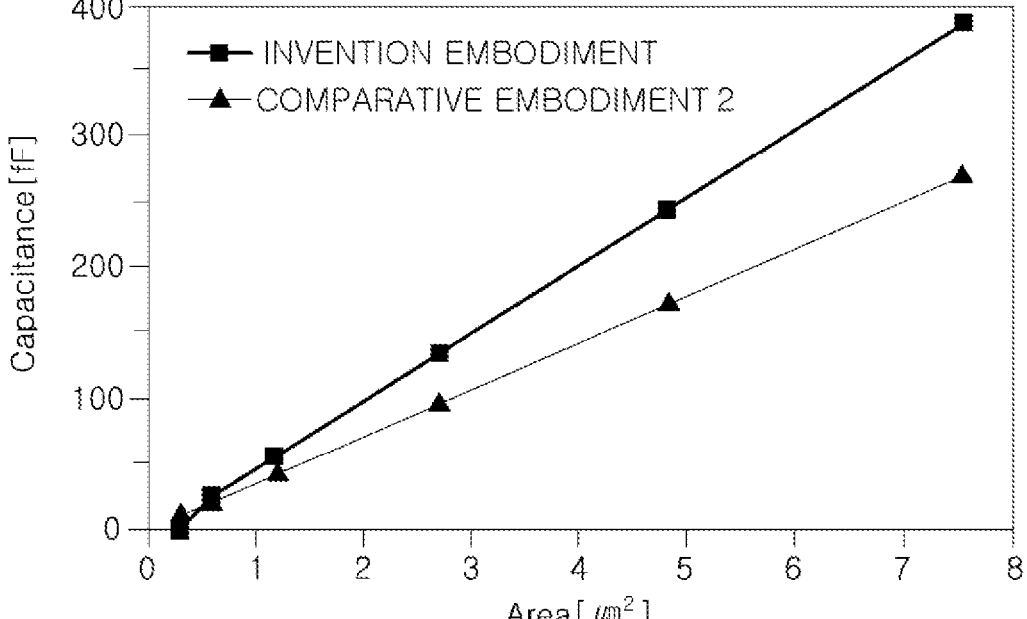
FIG. 18 is a graph showing capacitance according to the area of the unit devices of Invention embodiment and comparative embodiment 2.

FIG. 17 is a cross-sectional view of the capacitance formation portion of comparative embodiment 2, and FIG. 18 is a graph illustrating a capacitance according to an area of the unit devices of the invention embodiment and comparative embodiment 2.

In the case of the comparative embodiment 2, the capacitance formation portion is configured only using the first unit device 110 of the invention embodiment 1, and referring to FIG. 18, as the capacitance formation portion of the invention embodiment and comparative embodiment 2 increases, the capacitance of the embodiment 1 of the present invention is about 1.4 times higher than that of comparative embodiment 1 regardless of the area. In the case of the comparative embodiment 2, since the outer electrodes 113 of the adjacent unit devices have the same polarity, it can be determined that the capacitance is not formed in the outer dielectric 114, and thus the capacitance is different.

Hereinafter, referring to FIGS. 19 to 26, a method for manufacturing the capacitor component according to an embodiment of the present disclosure will be described. However, this is only an embodiment and the present invention is not limited thereto. In addition, an explanation overlapping the above contents is omitted.

Figure 19:
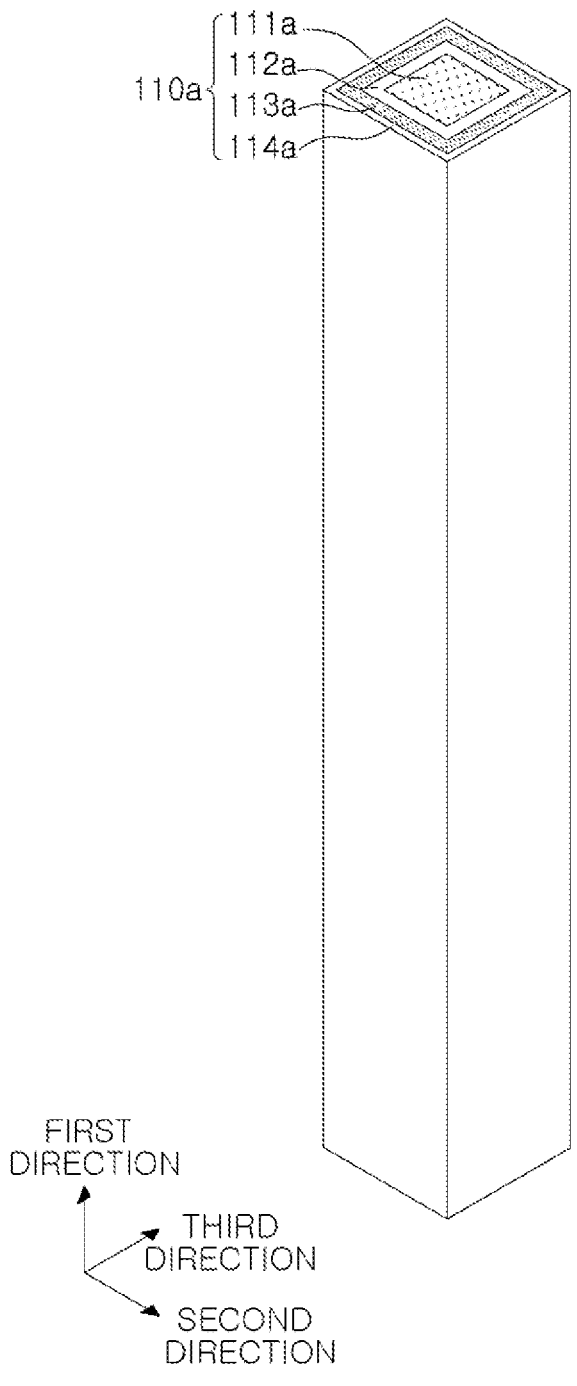
FIG. 19 is a perspective view of a first unit device.
Figure 20:
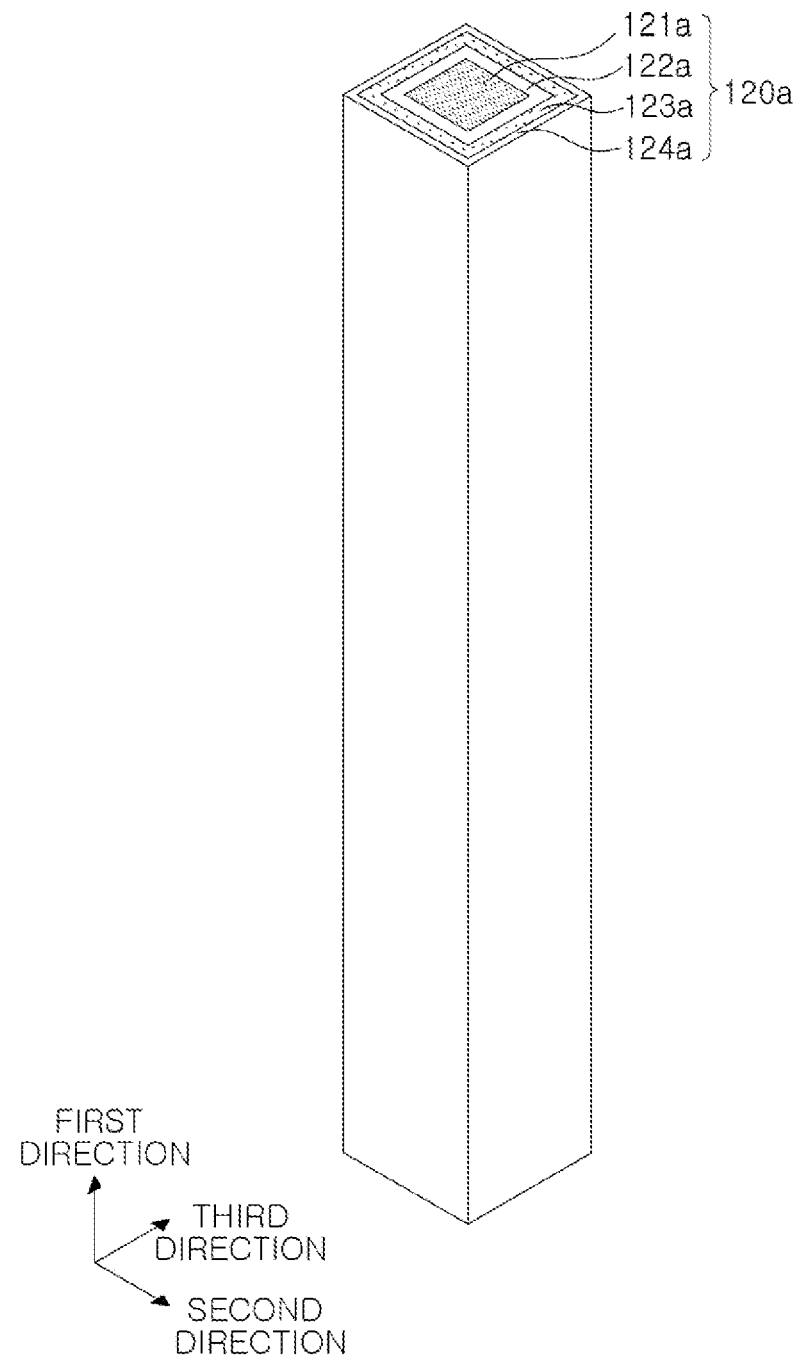
FIG. 20 is a perspective view of a second unit device.

First, as illustrated in FIGS. 19 and 20, the first unit device 110a and the second unit device 120a may be prepared.

Figure 21:
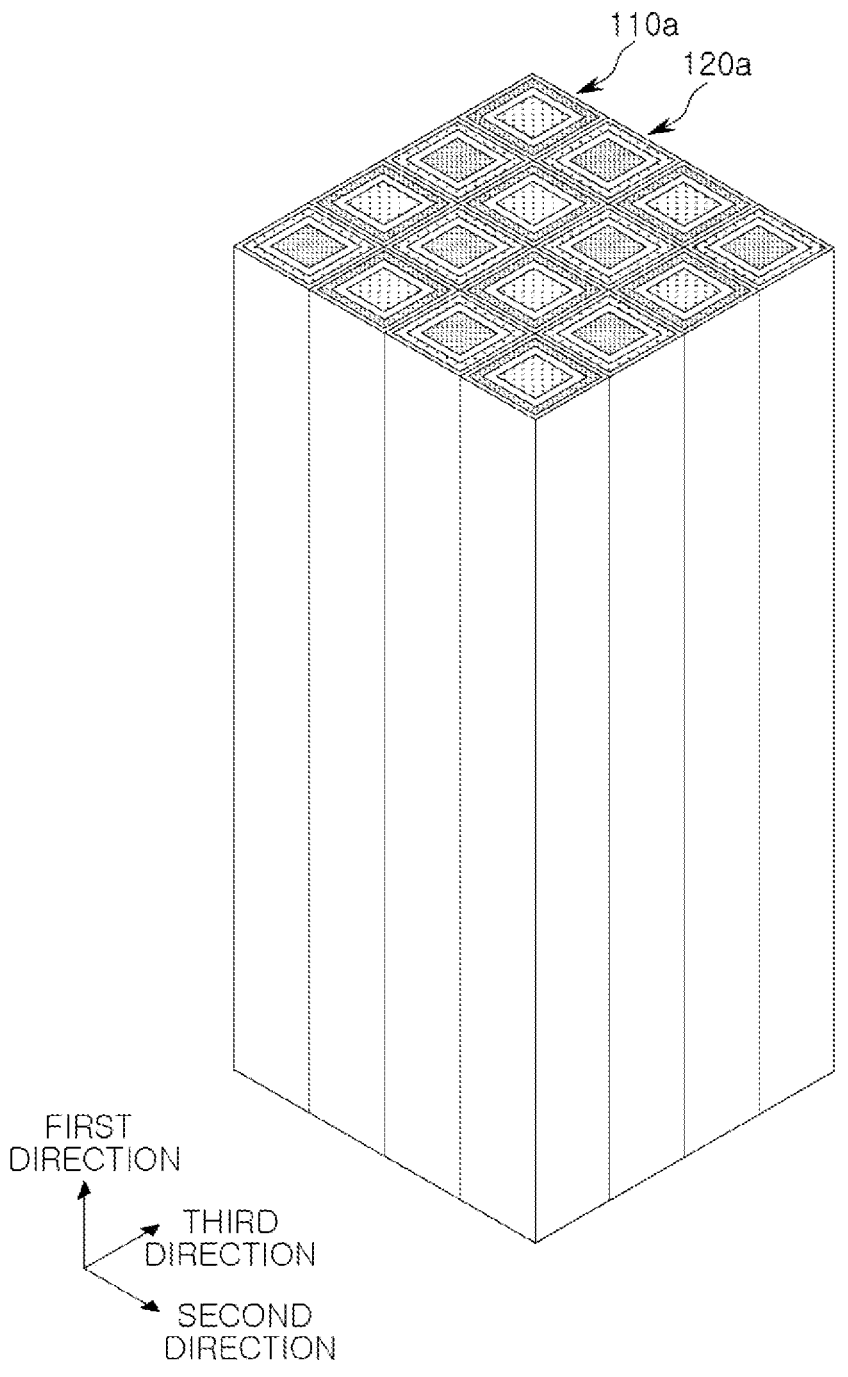
FIG. 21 is a perspective view of the capacitance formation portion formed by disposing first and second unit devices.

Thereafter, as illustrated in FIG. 21, a plurality of first and second unit devices 110a and 120a may be alternately disposed in the second and third directions to configure a capacitance formation portion.

Figure 22:
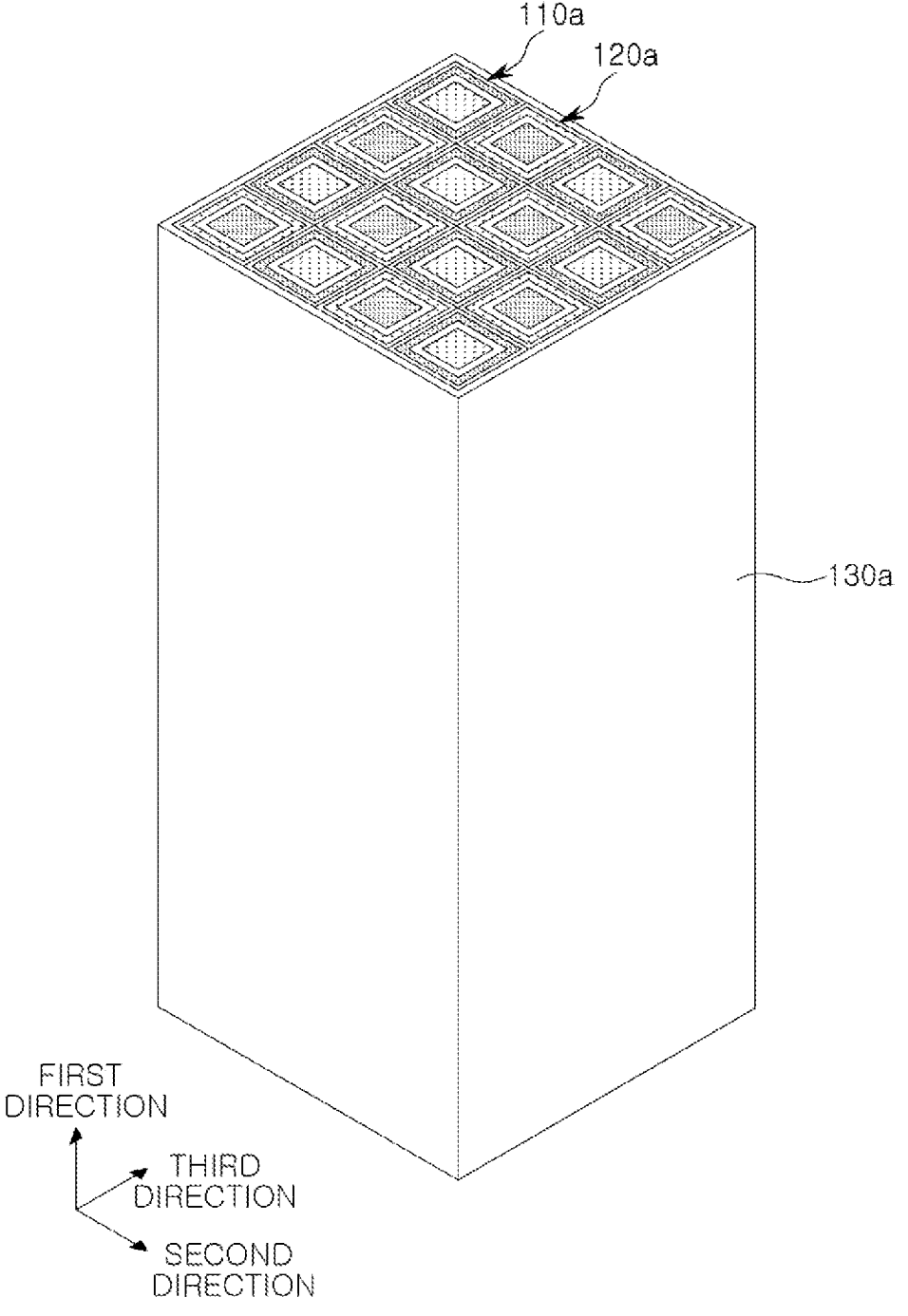
FIG. 22 is a perspective view after a molding part is formed in the capacitance formation portion.

Then, as illustrated in FIG. 22, a molding part 130a may be formed to surround cross sections perpendicular to the first direction of the plurality of first and second unit devices 110a and 120a alternately arranged in the second and third directions.

Figure 23:
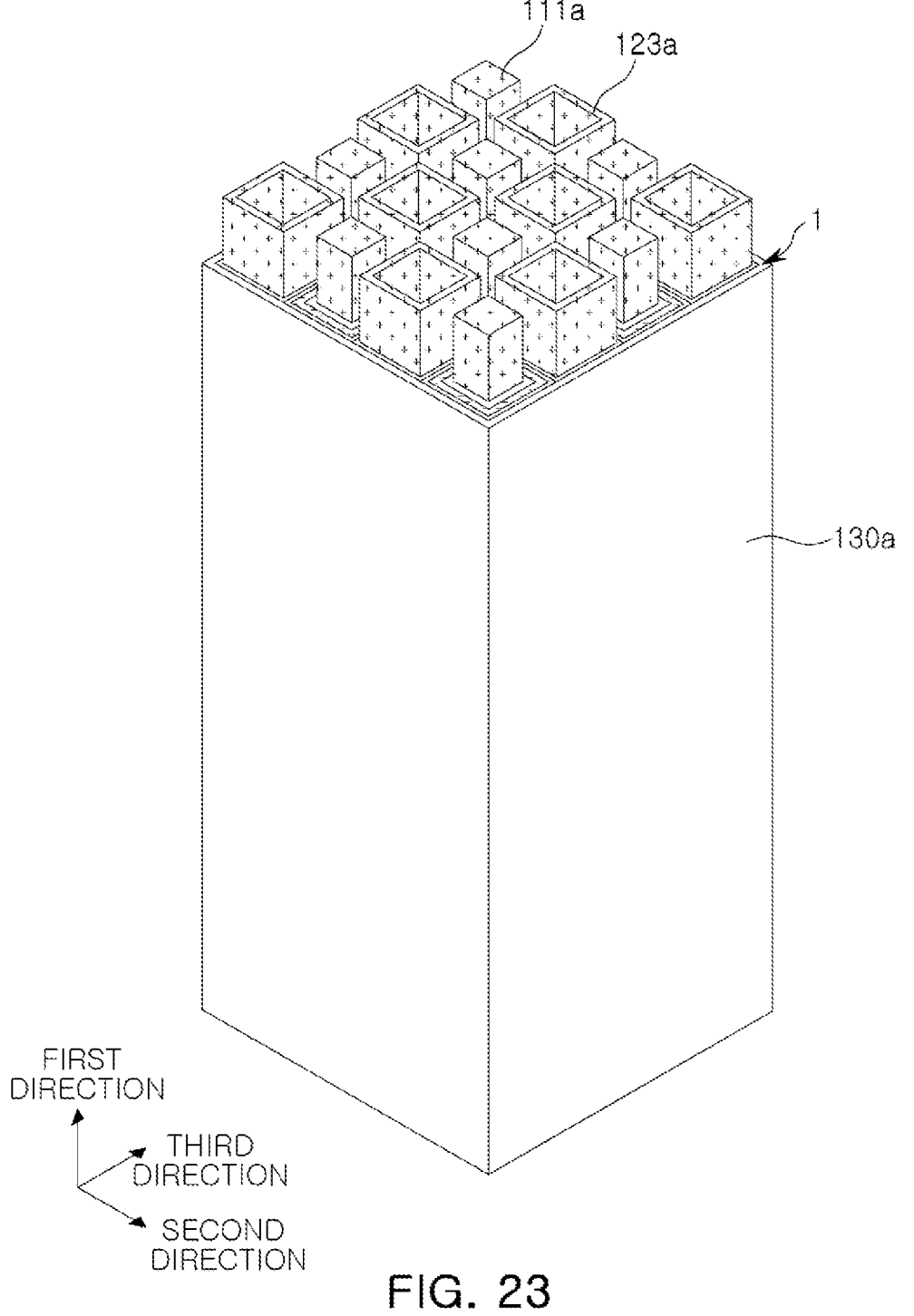
FIG. 23 is a perspective view of a body after the first etching process.

Thereafter, as illustrated in FIG. 23, the first etching process may be performed so that the first central electrode 111a and the second outer electrode 123a protrude from the first surface 1 of the body.

Figure 24:
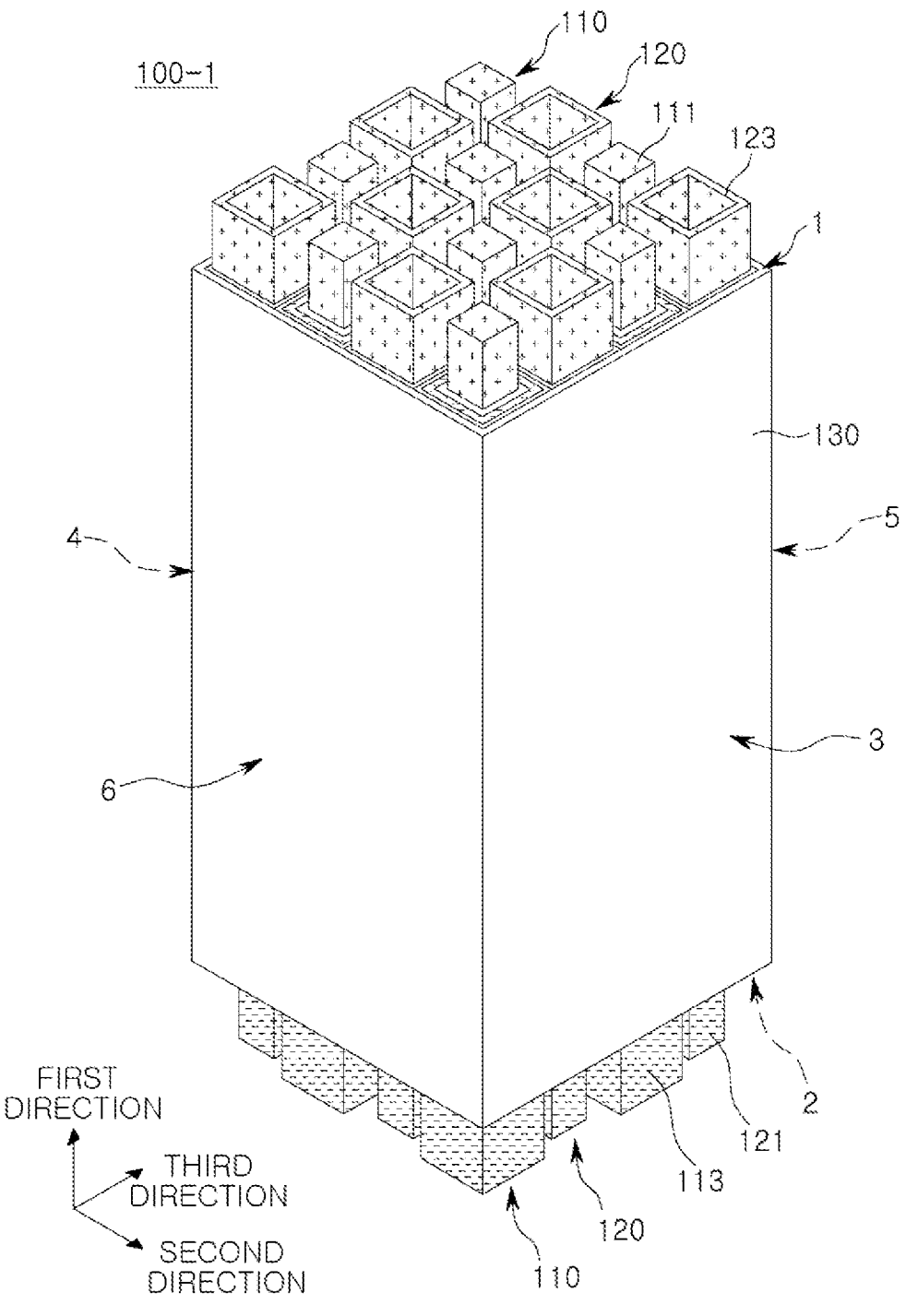
FIG. 24 is a perspective view of a body after the second etching process.

Then, as illustrated in FIG. 24, the body 100-1 may be completed by performing a second etching process so that the second central electrode 121 and the first outer electrode 113 protrude from the second surface 20 of the body 100-1.

Figure 25:
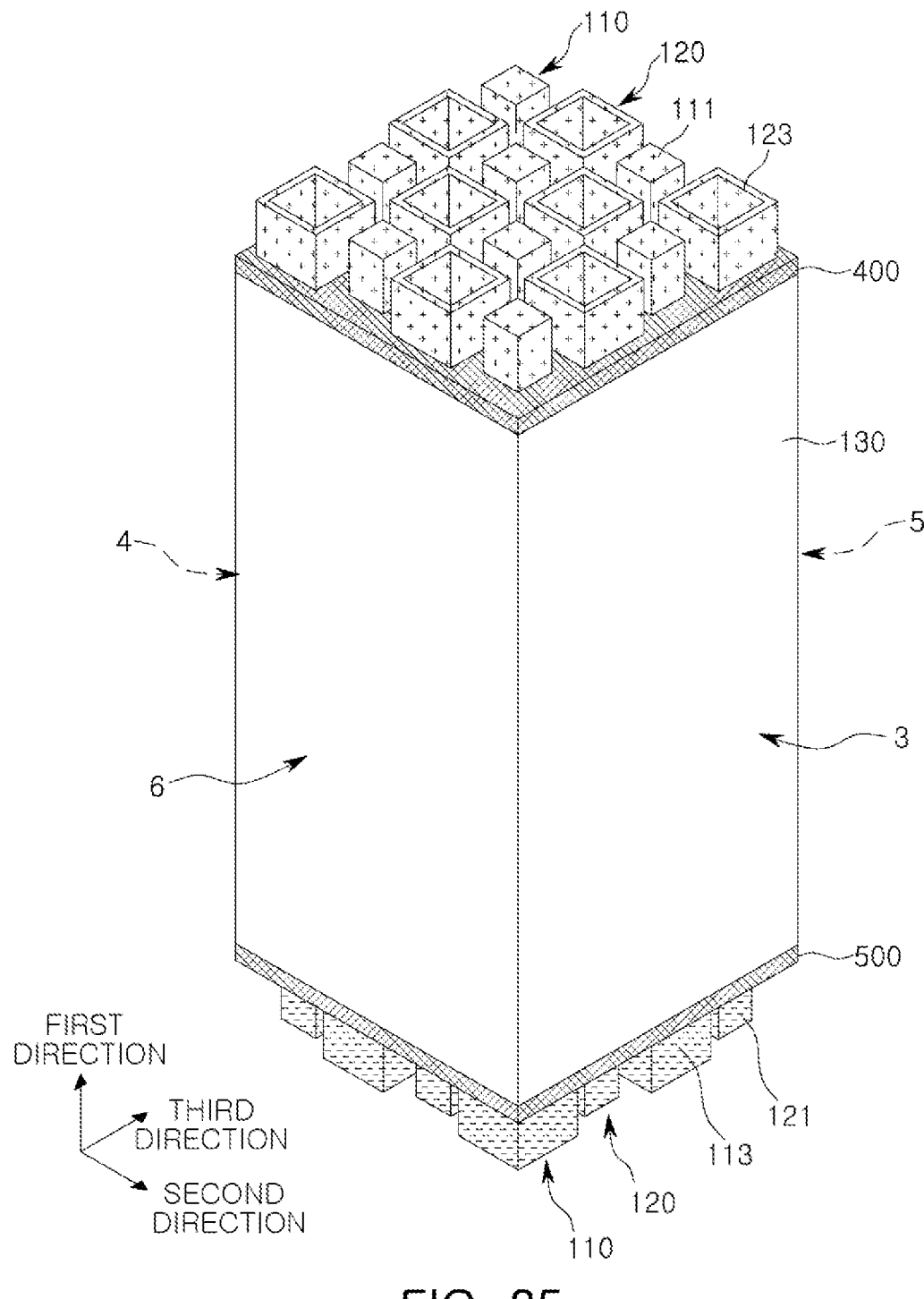
FIG. 25 is a perspective view of a body after an insulating film is formed.

Then, as illustrated in FIG. 25, the first and second insulating films 400 and 500 may be disposed on the first and second surfaces of the body, respectively. The first insulating film 400 may be disposed to cover the second central electrode 121 and the first outer electrode 113, and the second insulating film 500 may be disposed to cover the first central electrode 111 and the second outer electrode 123.

Then, the capacitor component may be manufactured by forming the external electrode.

The present disclosure is not limited by the above-described embodiments and accompanied drawings, but it is intended to be limited by the appended claims. Therefore, various forms of substitution, modification and changes will be possible by skilled persons in the art within the scope of the technical spirit of the present disclosure described in the claims, and this will also be said to fall within the scope of the present disclosure.

Also, the expression 'an embodiment' used in this description does not refer to the same embodiments, and is provided to emphasize and describe each different unique feature. However, the embodiments presented above do not exclude being implemented in combination with features of other embodiments. For example, even if a point described in an embodiment is not described in another embodiment, it may be understood as a description related to another embodiment, unless there is a description that is contrary or contradictory to the point in another embodiment.

DESCRIPTION OF THE LABELS

1000: CAPACITOR COMPONENT
100: BODY
110: FIRST UNIT DEVICE
111: FIRST CENTRAL ELECTRODE
112: FIRST CENTRAL DIELECTRIC
113: FIRST OUTER ELECTRODE
114: FIRST OUTER DIELECTRIC
120: SECOND UNIT DEVICE
121: SECOND CENTRAL ELECTRODE
122: SECOND CENTRAL DIELECTRIC
123: SECOND OUTER ELECTRODE
124: SECOND OUTER DIELECTRIC
130: MOLDING PART
200, 300: EXTERNAL ELECTRODES
210, 310: FIRST ELECTRODE LAYERS
220, 320: SECOND ELECTRODE LAYERS
400, 500: INSULATION FILMS
600, 700: CONNECTION ELECTRODES

What is claimed is:

1. A capacitor component comprising:
a first unit device extending in a first direction and including a first central electrode, a first central dielectric surrounding the first central electrode in a direction perpendicular to the first direction, a first outer electrode surrounding the first central dielectric in a direction perpendicular to the first direction, and a first outer dielectric surrounding the first outer electrode in a direction perpendicular to the first direction;
a second unit device extending in the first direction and including a second central electrode, a second central dielectric surrounding the second central electrode in a direction perpendicular to the first direction, and a second outer electrode surrounding the second central dielectric in a direction perpendicular to the first direction, and a second outer dielectric surrounding the second outer electrode in a direction perpendicular to the first direction;
a body comprising a capacitance formation portion including the first and second unit devices arranged side by side in a direction perpendicular to the first direction, and first and second surfaces opposing each other in the first direction;
a first external electrode disposed on the first surface of the body and connected to the first central electrode and the second outer electrode; and
a second external electrode disposed on the second surface of the body and connected to the second central electrode and the first outer electrode.

2. The capacitor component of claim 1, wherein the first central electrode and the second outer electrode protrude from the first surface, and the second central electrode and the first outer electrode protrude from the second surface.

3. The capacitor component of claim 2, further comprising a first insulating film that covers the second central electrode and the first outer electrode and is disposed between the first outer electrode and the first surface, and a second insulating film that covers the first central electrode and the second outer electrode and is disposed between the second outer electrode and the second surface.

4. The capacitor component of claim 1, wherein in a cross section perpendicular to the first direction, the first unit device is one of a circle shape, an ellipse shape, an irregular shape, or a polygonal shape, and the second unit device may be one of the circle shape, the ellipse shape, the irregular shape, or the polygonal shape.

5. The capacitor component of claim 1,
wherein in a cross section perpendicular to the first direction,
the first unit device is a polygonal shape, and
the second unit device is a polygonal shape.

6. The capacitor component of claim 5,
wherein in the cross section perpendicular to the first direction,
one side of the first unit device is in contact with one side of the second unit device while facing each other.

7. The capacitor component of claim 6, wherein the one side of the first unit device and the one side of the second unit device, which are in contact with each other and opposing each other, have substantially the same length.

8. The capacitor component of claim 5, wherein the first and second unit devices adjacent to each other are referred to as a unit capacitance portion, and
in the cross section perpendicular to the first direction, the unit capacitance portion is a rectangular shape.

9. The capacitor component of claim 1, wherein the capacitance formation portion includes a plurality of the first and second unit devices alternately arranged in a second direction perpendicular to the first direction.

10. The capacitor component of claim 1, wherein the first central electrode and the second outer electrode are connected to the first surface and are disposed to be spaced apart from the second surface, and
the second central electrode and the first outer electrode are connected to the second surface and are disposed to be spaced apart from the first surface.

11. The capacitor component of claim 10, further comprising a first insulating film that is disposed in a space in which the second central electrode and the first outer electrode are spaced apart from the first surface, and
a second insulating film that is disposed in a space in which the first central electrode and the second outer electrode are spaced apart from the second surface.

12. The capacitor component of claim 11, wherein a first connection electrode is disposed between the first external electrode and the first surface, and
a second connection electrode is disposed between the second external electrode and the second surface.

13. The capacitor component of claim 12, wherein the first and second connection electrodes are a plating layer or a sputtering layer.

14. The capacitor component of claim 12, wherein the first and second connection electrodes are substantially made of metal.

15. The capacitor component of claim 1, wherein the body further includes a molding part surrounding the capacitance formation portion in a direction perpendicular to the first direction.

16. The capacitor component of claim 1, wherein the body further includes a molding part surrounding the capacitance formation portion, the first and second external electrodes are disposed on the molding part, the first central electrode and the second outer electrode protrude from the molding part and are connected to the first external electrode, and the second central electrode and the second outer electrode protrude from the molding part and are connected to the second external electrode.

17. The capacitor component of claim 1, wherein metals included in the first central electrode and the second outer electrode are different from metals included in the second central electrode and the first outer electrode.

18. The capacitor component of claim 1, wherein the first and second central electrodes, and the first and second outer electrodes may include at least one of copper (Cu), aluminum (Al), nickel (Ni), lead (Pb), cobalt (Co), tungsten (W), molybdenum (Mo), tin (Sn), silver (Ag), or gold (Au), and metals included in the first central electrode and the second outer electrode are different from metals included in the second central electrode and the first outer electrode.

19. The capacitor component of claim 1, wherein dielectric materials of the first and second central dielectrics are different from dielectric materials of the first and second outer dielectrics.

20. The capacitor component of claim 1, wherein a dimension in the first direction of the first unit device is times or more greater than a maximum dimension of the first unit device in a cross section perpendicular to the first direction, and a dimension in the first direction of the second unit device is 10 times or more greater than a maximum dimension of the second unit device in a cross section perpendicular to the first direction.

21. The capacitor component of claim 1, wherein in a cross section of the first unit device perpendicular to the first direction, outer sides of the first central electrode, the first central dielectric, the first outer electrode, and the first outer dielectric have substantially the same shape as each other, and in a cross section of the second unit device perpendicular to the first direction, outer sides of the second central electrode, the second central dielectric, the second outer electrode, and the second outer dielectric have substantially the same shape as each other.

22. The capacitor component of claim 1, wherein the capacitance formation portion includes a plurality of the first and second unit devices alternately arranged in a second direction perpendicular to the first direction, and alternately arranged in a third direction perpendicular to the first and second directions.

23. The capacitor component of claim 22, wherein in a cross section perpendicular to the first direction, the first unit device is a polygonal shape, and the second unit device is a polygonal shape.

24. The capacitor component of claim 23, wherein in the cross section perpendicular to the first direction, one side of the first unit device is in contact with one side of the second unit device while facing each other, and all sides of the first unit device are not in contact with the one side of another first unit device, in a state in which it faces the one side of the another first unit device.

25. The capacitor component of claim 23, wherein in the cross section perpendicular to the first direction, one side of the first unit device except for an outer side of the capacitance formation portion is in contact with one side of the second unit device while facing each other, and one side of the second unit device except for an outer side of the capacitance formation portion is in contact with the one side of the first unit device while facing each other.

26. The capacitor component of claim 25, wherein the one side of the first unit device and the one side of the second unit device, which are in contact with and opposing each other, have substantially the same length.

27. The capacitor component of claim 23, wherein in the cross section perpendicular to the first direction, the first and second unit devices each are in a triangular shape.

28. The capacitor component of claim 23, wherein the first and second unit devices adjacent to each other are referred to as a unit capacitance portion, and in the cross section perpendicular to the first direction, the unit capacitance portion is a rectangular shape.

29. The capacitor component of claim 23, wherein in the cross section perpendicular to the first direction, the first and second unit devices are a rectangular shape.

30. A capacitor component comprising:

a first unit device extending in a first direction and including a first central electrode, a first central dielectric surrounding the first central electrode in a direction perpendicular to the first direction, a first outer electrode surrounding the first central dielectric in a direction perpendicular to the first direction, and a first outer dielectric surrounding the first outer electrode in a direction perpendicular to the first direction;

a second unit device extending in the first direction and including a second central electrode, a second central dielectric surrounding the second central electrode in a direction perpendicular to the first direction, and a second outer electrode surrounding the second central dielectric in a direction perpendicular to the first direction, and a second outer dielectric surrounding the second outer electrode in a direction perpendicular to the first direction;

a body comprising a capacitance formation portion including the first and second unit devices arranged side by side in a direction perpendicular to the first direction, and first and second surfaces opposing each other in the first direction;

a first external electrode disposed on the first surface of the body and connected to the first central electrode and the second outer electrode; and a second external electrode disposed on the second surface of the body and connected to the second central electrode and the first outer electrode, wherein at least a portion of the first outer dielectric is in contact with at least a portion of the second outer dielectric to form an outer dielectric.

31. The capacitor component of claim 30, wherein the first central electrode and the second outer electrode protrude from the first surface, and the second central electrode and the first outer electrode protrude from the second surface.

32. The capacitor component of claim 30, further comprising a first insulating film that covers the second central electrode and the first outer electrode and is disposed between the first outer electrode and the first surface, and a second insulating film that covers the first central electrode and the second outer electrode and is disposed between the second outer electrode and the second surface.

33. The capacitor component of claim 30, wherein in a cross section perpendicular to the first direction, the first unit device is a polygonal shape, and the second unit device is a polygonal shape.

34. The capacitor component of claim 33, wherein the first and second unit devices adjacent to each other are referred to as a unit capacitance portion, and in the cross section perpendicular to the first direction, the unit capacitance portion is a rectangular shape.

35. The capacitor component of claim 30, wherein the first central electrode and the second outer electrode are connected to the first surface and are disposed to be spaced apart from the second surface, and the second central electrode and the first outer electrode are connected to the second surface and are disposed to be spaced apart from the first surface.

36. The capacitor component of claim 35, further comprising a first insulating film that is disposed in a space in which the second central electrode and the first outer electrode are spaced apart from the first surface, and a second insulating film that is disposed in a space in which the first central electrode and the second outer electrode are spaced apart from the second surface.

37. The capacitor component of claim 30, wherein the body further includes a molding part surrounding the capacitance formation portion in a direction perpendicular to the first direction.

38. The capacitor component of claim 30, wherein metals included in the first central electrode and the second outer electrode are different from metals included in the second central electrode and the first outer electrode.

39. The capacitor component of claim 30, wherein the capacitance formation portion includes a plurality of the first and second unit devices alternately arranged in a second direction perpendicular to the first direction, and alternately arranged in a third direction perpendicular to the first and second directions.

\* \* \* \* \*